US006510254B1

(12) United States Patent
Nakami et al.

(10) Patent No.: US 6,510,254 B1
(45) Date of Patent: Jan. 21, 2003

(54) APPARATUS AND METHOD FOR IMAGE DATA INTERPOLATION AND MEDIUM ON WHICH IMAGE DATA INTERPOLATION PROGRAM IS RECORDED

(75) Inventors: Yoshihiro Nakami, Nagano (JP); Naoki Kuwata, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/274,981

(22) Filed: Mar. 23, 1999

(30) Foreign Application Priority Data

| Apr. 6, 1998 | (JP) | 10-093740 |
| Apr. 20, 1998 | (JP) | 10-109899 |
| May 6, 1998 | (JP) | 10-123731 |

(51) Int. Cl.$^7$ .............................. G06K 9/32; H04N 1/46
(52) U.S. Cl. ...................................... 382/300; 358/525
(58) Field of Search ................................ 382/298, 299, 382/300, 173, 254; 358/428, 525, 1.2, 528; 345/132, 606, 607, 608, 609, 660

(56) References Cited

U.S. PATENT DOCUMENTS

| 5,131,057 A | * | 7/1992 | Walowit et al. ............. 382/264 |
| 5,327,257 A | | 7/1994 | Hrytzak et al. ............. 358/447 |
| 5,438,654 A | * | 8/1995 | Drebin et al. ................ 345/439 |
| 5,489,952 A | * | 2/1996 | Gove et al. .................. 348/771 |
| 5,726,766 A | * | 3/1998 | Saotomer .................... 358/428 |
| 5,754,710 A | * | 5/1998 | Sekine et al. ............... 382/300 |
| 5,760,781 A | * | 6/1998 | Kaufman et al. ........... 345/424 |
| 5,905,822 A | * | 5/1999 | Ito et al. ...................... 382/300 |
| 5,930,142 A | * | 7/1999 | Schleicher et al. ..... 364/474.31 |
| 6,016,164 A | * | 1/2000 | Kawaguchi et al. ........ 348/424 |

FOREIGN PATENT DOCUMENTS

| EP | 0 367 418 A2 | 5/1990 | |
| EP | 0 709 825 A2 | 5/1996 | |
| JP | 58-27146 | 2/1983 | ............. G03F/1/00 |
| JP | 63-311865 | 12/1988 | .......... H04N/1/387 |
| JP | 2-9268 | 1/1990 | .......... H04N/1/387 |
| JP | 4-81981 | 3/1992 | ........... G06F/15/66 |
| JP | 4-81982 | 3/1992 | ........... G06F/15/66 |
| JP | 5-225323 | 9/1993 | ........... G06F/15/66 |
| JP | 6-225140 | 8/1994 | ............. H04N/1/40 |
| JP | 7-93531 | 4/1995 | ............. G06T/3/40 |
| JP | 7-107273 | 4/1995 | .......... H04N/1/393 |
| JP | 8-125848 | 5/1996 | |
| JP | 08125848 | 5/1996 | .......... H04N/1/393 |
| JP | 09050516 | 2/1997 | ............. G06T/3/40 |
| JP | 09130597 | 5/1997 | .......... H04N/1/393 |
| JP | 9-252400 | 9/1997 | .......... H04N/1/393 |
| JP | 9-252401 | 9/1997 | .......... H04N/1/393 |
| JP | 10-126612 | 5/1998 | .......... H04N/1/393 |
| WO | WO 96/16380 | 5/1996 | |

* cited by examiner

Primary Examiner—Jose L. Couso
Assistant Examiner—Kanji Patel
(74) Attorney, Agent, or Firm—Sughrue Mion, PLLC

(57) ABSTRACT

An image data interpolation apparatus includes an image data obtaining unit for obtaining image data representing an image as dot-matrix picture elements, a picture element interpolating unit capable of selectively executing one of a plurality of interpolating processes when the image data is interpolated so that the number of constituent picture elements thereof is increased, an interpolating scale factor obtaining unit for obtaining an interpolating scale factor suitable for the image data, and an interpolating process selecting unit for selecting one of the interpolating processes capable of obtaining an optimum result of interpolation according to the interpolating scale factor obtained by the interpolating scale factor obtaining unit and causing the picture element interpolating unit to execute the selected interpolating process.

9 Claims, 35 Drawing Sheets

○ EXISTING PICTURE ELEMENT

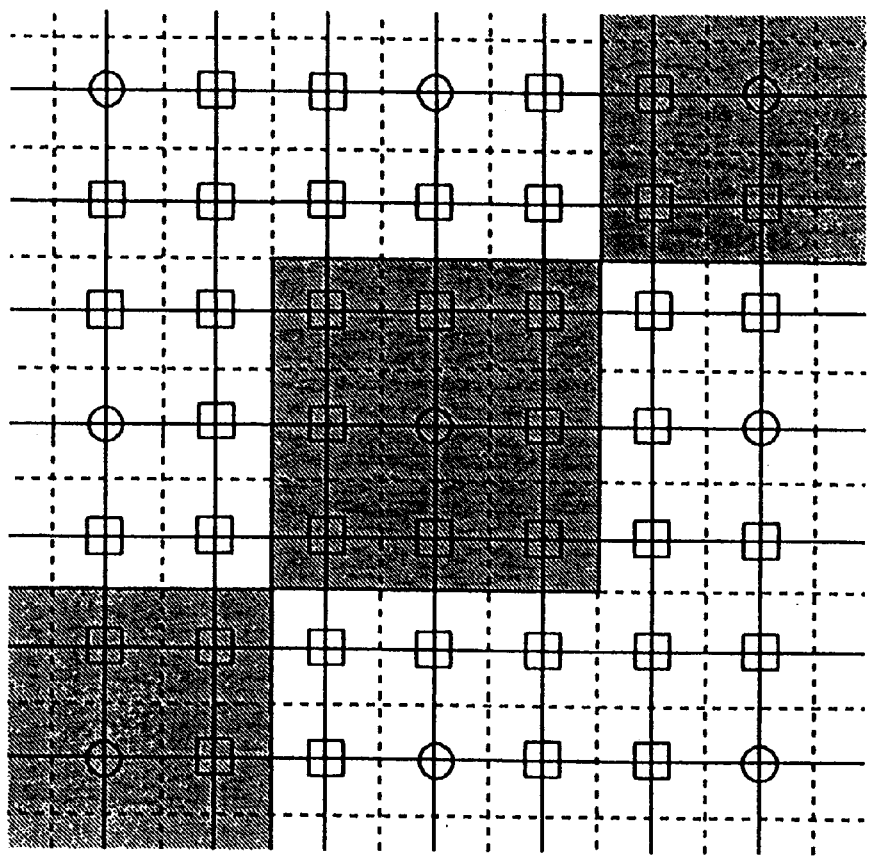
○ EXISTING PICTURE ELEMENT
☐ INTERPOLATED PICTURE ELEMENT
F I G. 1 3

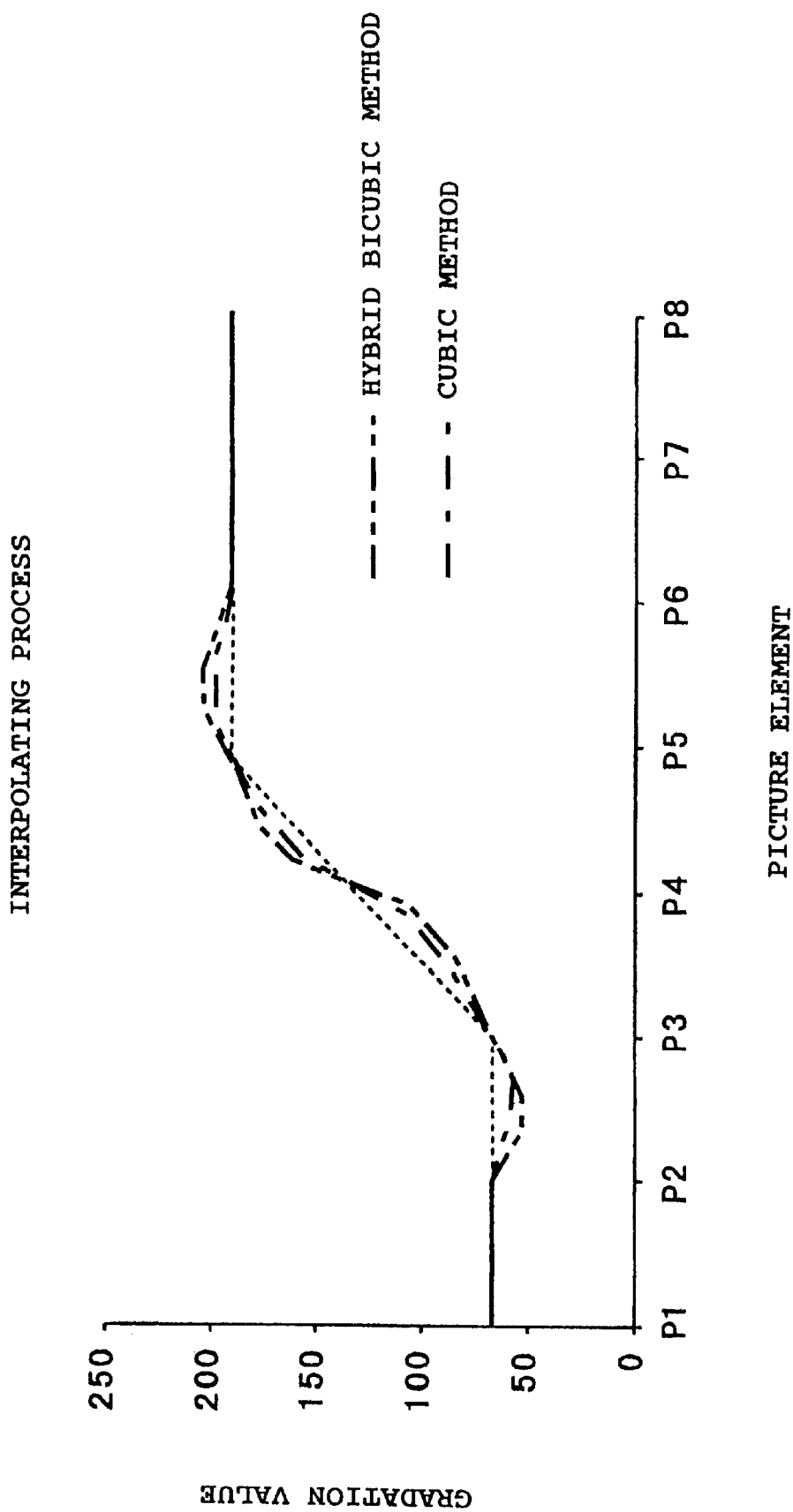
F I G. 15

FIG. 16

| | PICTURE ELEMENT | ORIGINAL | x1 | x2 | x3 | x4 | f1 | f2 | f3 | f4 | CUBIC |
|---|---|---|---|---|---|---|---|---|---|---|---|
| 64 | P0 | 64 | | | | | | | | | 64 |
| 64 | | | | | | | | | | | |
| 64 | | | | | | | | | | | |
| 64 | | | | | | | | | | | |
| 64 | P1 | 64 | 1 | 0 | 1 | 2 | 0 | 1 | 0 | 0 | 64 |
| 64 | P11 | | 1.25 | 0.25 | 0.75 | 1.75 | -0.14063 | 0.890625 | 0.296875 | -0.04688 | 64 |
| 64 | P12 | | 1.5 | 0.5 | 0.5 | 1.5 | -0.125 | 0.625 | 0.625 | -0.125 | 64 |
| 64 | P13 | | 1.75 | 0.75 | 0.25 | 1.25 | -0.04688 | 0.296875 | 0.890625 | -0.14063 | 64 |
| 64 | P2 | 64 | 1 | 0 | 1 | 2 | 0 | 1 | 0 | 0 | 64 |
| 64 | P21 | | 1.25 | 0.25 | 0.75 | 1.75 | -0.14063 | 0.890625 | 0.296875 | -0.04688 | 61 |
| 64 | P22 | | 1.5 | 0.5 | 0.5 | 1.5 | -0.125 | 0.625 | 0.625 | -0.125 | 56 |
| 64 | P23 | | 1.75 | 0.75 | 0.25 | 1.25 | -0.04688 | 0.296875 | 0.890625 | -0.14063 | 55 |
| 64 | P3 | 64 | 1 | 0 | 1 | 2 | 0 | 1 | 0 | 0 | 64 |
| 80 | P31 | | 1.25 | 0.25 | 0.75 | 1.75 | -0.14063 | 0.890625 | 0.296875 | -0.04688 | 77 |
| 96 | P32 | | 1.5 | 0.5 | 0.5 | 1.5 | -0.125 | 0.625 | 0.625 | -0.125 | 88 |
| 112 | P33 | | 1.75 | 0.75 | 0.25 | 1.25 | -0.04688 | 0.296875 | 0.890625 | -0.14063 | 103 |
| 128 | P4 | 128 | 1 | 0 | 1 | 2 | 0 | 1 | 0 | 0 | 128 |
| 144 | P41 | | 1.25 | 0.25 | 0.75 | 1.75 | -0.14063 | 0.890625 | 0.296875 | -0.04688 | 153 |
| 160 | P42 | | 1.5 | 0.5 | 0.5 | 1.5 | -0.125 | 0.625 | 0.625 | -0.125 | 168 |
| 176 | P43 | | 1.75 | 0.75 | 0.25 | 1.25 | -0.04688 | 0.296875 | 0.890625 | -0.14063 | 179 |
| 192 | P5 | 192 | 1 | 0 | 1 | 2 | 0 | 1 | 0 | 0 | 192 |
| 192 | P51 | | 1.25 | 0.25 | 0.75 | 1.75 | -0.14063 | 0.890625 | 0.296875 | -0.04688 | 201 |
| 192 | P52 | | 1.5 | 0.5 | 0.5 | 1.5 | -0.125 | 0.625 | 0.625 | -0.125 | 200 |
| 192 | P53 | | 1.75 | 0.75 | 0.25 | 1.25 | -0.04688 | 0.296875 | 0.890625 | -0.14063 | 195 |
| 192 | P6 | 192 | 1 | 0 | 1 | 2 | 0 | 1 | 0 | 0 | 192 |
| 192 | P61 | | 1.25 | 0.25 | 0.75 | 1.75 | -0.14063 | 0.890625 | 0.296875 | -0.04688 | 192 |
| 192 | P62 | | 1.5 | 0.5 | 0.5 | 1.5 | -0.125 | 0.625 | 0.625 | -0.125 | 192 |
| 192 | P63 | | 1.75 | 0.75 | 0.25 | 1.25 | -0.04688 | 0.296875 | 0.890625 | -0.14063 | 192 |
| 192 | P7 | 192 | 1 | 0 | 1 | 2 | 0 | 1 | 0 | 0 | 192 |
| 192 | P71 | | 1.25 | 0.25 | 0.75 | 1.75 | -0.14063 | 0.890625 | 0.296875 | -0.04688 | 192 |
| 192 | P72 | | 1.5 | 0.5 | 0.5 | 1.5 | -0.125 | 0.625 | 0.625 | -0.125 | 192 |
| 192 | P73 | | 1.75 | 0.75 | 0.25 | 1.25 | -0.04688 | 0.296875 | 0.890625 | -0.14063 | 192 |
| 192 | P8 | 192 | 1 | 0 | 1 | 2 | 0 | 1 | 0 | 0 | 192 |
| 192 | P81 | | 1.25 | 0.25 | 0.75 | 1.75 | -0.14063 | 0.890625 | 0.296875 | -0.04688 | 192 |
| 192 | P82 | | 1.5 | 0.5 | 0.5 | 1.5 | -0.125 | 0.625 | 0.625 | -0.125 | 192 |
| 192 | P83 | | 1.75 | 0.75 | 0.25 | 1.25 | -0.04688 | 0.296875 | 0.890625 | -0.14063 | 192 |
| 192 | P9 | 192 | 1 | | | | | | | 0 | 192 |

FIG. 17

| PICTURE ELEMENT | ORIGINAL | x1 | x2 | x3 | x4 | f1 | f2 | f3 | f4 | HYBRID BICUBIC |
|---|---|---|---|---|---|---|---|---|---|---|
| P0 | 64 | | | | | | | | | |
| | 64 | | | | | | | | | |
| | 64 | | | | | | | | | |
| | 64 | | | | | | | | | |
| P1 | 64 | 1 | 0 | 1 | 2 | 0.00 | 1.00 | 0.00 | 0.00 | 64 |
| P11 | | 1.25 | 0.25 | 0.75 | 1.75 | -0.20 | 0.95 | 0.36 | -0.11 | 64 |
| P12 | | 1.5 | 0.5 | 0.5 | 1.5 | -0.21 | 0.71 | 0.71 | -0.21 | 64 |
| P13 | | 1.75 | 0.75 | 0.25 | 1.25 | -0.11 | 0.36 | 0.95 | -0.20 | 64 |
| P2 | 64 | 1 | 0 | 1 | 2 | 0.00 | 1.00 | 0.00 | 0.00 | 64 |
| P21 | | 1.25 | 0.25 | 0.75 | 1.75 | -0.20 | 0.95 | 0.36 | -0.11 | 64 |
| P22 | | 1.5 | 0.5 | 0.5 | 1.5 | -0.21 | 0.71 | 0.71 | -0.21 | 57 |
| P23 | | 1.75 | 0.75 | 0.25 | 1.25 | -0.11 | 0.36 | 0.95 | -0.20 | 50 |
| P3 | 64 | 1 | 0 | 1 | 2 | 0.00 | 1.00 | 0.00 | 0.00 | 51 |
| P31 | 80 | 1.25 | 0.25 | 0.75 | 1.75 | -0.20 | 0.95 | 0.36 | -0.11 | 64 |
| P32 | 96 | 1.5 | 0.5 | 0.5 | 1.5 | -0.21 | 0.71 | 0.71 | -0.21 | 73 |
| P33 | 112 | 1.75 | 0.75 | 0.25 | 1.25 | -0.11 | 0.36 | 0.95 | -0.20 | 82 |
| P4 | 128 | 1 | 0 | 1 | 2 | 0.00 | 1.00 | 0.00 | 0.00 | 99 |
| P41 | 144 | 1.25 | 0.25 | 0.75 | 1.75 | -0.20 | 0.95 | 0.36 | -0.11 | 128 |
| P42 | 160 | 1.5 | 0.5 | 0.5 | 1.5 | -0.21 | 0.71 | 0.71 | -0.21 | 157 |
| P43 | 176 | 1.75 | 0.75 | 0.25 | 1.25 | -0.11 | 0.36 | 0.95 | -0.20 | 174 |
| P5 | 192 | 1 | 0 | 1 | 2 | 0.00 | 1.00 | 0.00 | 0.00 | 183 |
| P51 | 192 | 1.25 | 0.25 | 0.75 | 1.75 | -0.20 | 0.95 | 0.36 | -0.11 | 192 |
| P52 | 192 | 1.5 | 0.5 | 0.5 | 1.5 | -0.21 | 0.71 | 0.71 | -0.21 | 205 |
| P53 | 192 | 1.75 | 0.75 | 0.25 | 1.25 | -0.11 | 0.36 | 0.95 | -0.20 | 206 |
| P6 | 192 | 1 | 0 | 1 | 2 | 0.00 | 1.00 | 0.00 | 0.00 | 199 |
| P61 | 192 | 1.25 | 0.25 | 0.75 | 1.75 | -0.20 | 0.95 | 0.36 | -0.11 | 192 |
| P62 | 192 | 1.5 | 0.5 | 0.5 | 1.5 | -0.21 | 0.71 | 0.71 | -0.21 | 192 |
| P63 | 192 | 1.75 | 0.75 | 0.25 | 1.25 | -0.11 | 0.36 | 0.95 | -0.20 | 192 |
| P7 | 192 | 1 | 0 | 1 | 2 | 0.00 | 1.00 | 0.00 | 0.00 | 192 |
| P71 | 192 | 1.25 | 0.25 | 0.75 | 1.75 | -0.20 | 0.95 | 0.36 | -0.11 | 192 |
| P72 | 192 | 1.5 | 0.5 | 0.5 | 1.5 | -0.21 | 0.71 | 0.71 | -0.21 | 192 |
| P73 | 192 | 1.75 | 0.75 | 0.25 | 1.25 | -0.11 | 0.36 | 0.95 | -0.20 | 192 |
| P8 | 192 | 1 | 0 | 1 | 2 | 0.00 | 1.00 | 0.00 | 0.00 | 192 |
| P81 | | 1.25 | 0.25 | 0.75 | 1.75 | -0.20 | 0.95 | 0.36 | -0.11 | 192 |
| P82 | | 1.5 | 0.5 | 0.5 | 1.5 | -0.21 | 0.71 | 0.71 | -0.21 | 192 |
| P83 | | 1.75 | 0.75 | 0.25 | 1.25 | -0.11 | 0.36 | 0.95 | -0.20 | 192 |
| P9 | 192 | 1 | 0 | 1 | 2 | 0.00 | 1.00 | 0.00 | 0.00 | |

APPARATUS AND METHOD FOR IMAGE DATA INTERPOLATION AND MEDIUM ON WHICH IMAGE DATA INTERPOLATION PROGRAM IS RECORDED

BACKGROUND OF THE INVENTION

1. Field of the Invention

This invention relates to an apparatus and a method for interpolating image data comprising dot matrix picture elements by a predetermined scale factor and a medium on which an image data interpolation program is recorded.

2. Description of the Prior Art

An image is represented as dot matrix picture elements when treated in a computer, and each picture element is represented by a gradation value. For example, a photograph and computer graphics are sometimes displayed on a screen of the computer by 640-dot picture elements in the horizontal direction and 480-dot picture elements in the vertical direction.

On the other hand, color printers have recently been improved in their performances rapidly and now have a high accurate dot density, for example, 720 dpi. When an original image composed of 640×480 dots is printed so that a printed image corresponds to the original one in the dots, the printed image becomes smaller than the original one. In this case, images to be printed have various gradation values, and the color printers have different resolutions. Accordingly, the original image data is required to be interpolated between dots before converted to printing image data.

The prior art has provided, as techniques for interpolating the dots, a nearest neighbor interpolation method (hereinafter, "nearest method") and a cubic convolution interpolation method (hereinafter, "cubic method"). Further, publication No. 6-225140 of a Japanese patent application discloses a technique for providing dot patterns so that an edge takes such an enlarged form as to be smoothed when edge smoothing is performed after dots have been interpolated.

The aforesaid interpolation techniques have the following problems. The nearest and cubic methods have their respective advantages and disadvantages. It is difficult for users to select either method in view of the relation between the interpolation technique and an interpolating scale factor. Further, when either method is selected and applied to an image unsuitable therefor, there is a possibility of a reduction in the quality of interpolation.

In the invention disclosed in the above-mentioned publication No. 6-225140, an interpolating scale factor is inevitably fixed since the dot patterns are previously provided. Accordingly, the interpolation cannot be applied to a case of any scale factor. Further, when color images are interpolated, the number of dot patterns to be previously provided becomes enormous and accordingly cannot previously be prepared.

SUMMARY OF THE INVENTION

Therefore, an object of the present invention is to provide an image data interpolation apparatus and method wherein results of optimum interpolation can be obtained for any interpolating scale factor, and a medium on which such an image data interpolation program is recorded.

The present invention provides an image data interpolation apparatus comprising an image data obtaining unit for obtaining image data representing an image as dot-matrix picture elements, a picture element interpolating unit capable of selectively executing one of a plurality of interpolating processes when the image data is interpolated so that the number of constituent picture elements thereof is increased, an interpolating scale factor obtaining unit for obtaining an interpolating scale factor suitable for the image data, and an interpolating process selecting unit for selecting one of the interpolating processes capable of obtaining an optimum result of interpolation according to the interpolating scale factor obtained by the interpolating scale factor obtaining unit and causing the picture element interpolating unit to execute the selected interpolating process.

In the invention thus constituted, the picture element interpolating unit is capable of executing one of the plurality of interpolating processes when interpolation is to be executed so that the number of constituent picture elements of the image data representing the image as dot-matrix picture elements is increased. When the image data obtaining unit obtains image data to be interpolated, the interpolating scale factor obtaining unit obtains the interpolating scale factor for the image data. The interpolating process selecting unit selects one of the interpolating processes capable of obtaining an optimum result of interpolation according to the interpolating scale factor obtained by the interpolating scale factor obtaining unit, causing the picture element interpolating unit to execute the selected interpolating process.

According to the aforesaid invention, the interpolating process to be executed is switched according to the selected interpolating scale factor. Consequently, the image data interpolation apparatus can easily achieve an optimum result of interpolation for the image data.

The technique for selecting one of a plurality of interpolating processes according to an interpolating scale factor should not be limited to a substantial apparatus. It can easily be understood that the technique is functioned as a method. Accordingly, the invention also provides an image data interpolation method comprising the steps of obtaining image data representing an image as dot-matrix picture elements, obtaining an interpolating scale factor suitable for the image data, selecting one of a plurality of interpolating processes capable of obtaining an optimum result of interpolation according to the obtained interpolating scale factor, and executing the selected interpolating process on the image data.

Thus, it is sure that the technique is not limited to a substantial device but is effective as a method.

The aforesaid image data interpolation apparatus may exist independently or may be incorporated into equipment. In other words, the scope of the present invention covers various forms of implementation. Further, the device may be implemented by hardware or software. When the apparatus is implemented by software, the invention applies equally to a medium on which the software is recorded.

As one example, the invention further provides a medium on which an image data interpolation program is recorded, the program causing a computer to execute an interpolating process for image data representing an image as dot-matrix picture elements and obtained by the computer so that the number of constituent picture elements of the image data is increased by a predetermined interpolating scale factor, the program causing the computer to execute the steps of obtaining image data representing an image as dot-matrix picture elements, obtaining an interpolating scale factor suitable for the image data, selecting one of a plurality of interpolating processes capable of obtaining an optimum result of interpolation according to the obtained interpolating scale factor, and executing the selected interpolating process on the image data.

The recording medium may be a magnetic recording medium, a photo-electromagnetic recording medium, any type of recording medium which will be developed in the feature. Further, it can be understood that the medium may be a first or second copy and that a telecommunication line may also be used to supply the program. Further, there is no difference as regards the concept of the invention even if one part is software and another part is hardware, or when it is in such a form that one part is stored on a recording medium which can be read when necessary.

BRIEF DESCRIPTION OF THE DRAWINGS

Other objects, features and advantages of the present invention will become clear upon reviewing the following description of the preferred embodiments made with reference to the accompanying drawings, in which:

FIG. 13 is a schematic illustration of picture elements after interpolation by the nearest method;

FIG. 15 is a graph showing the relationship between a gradation value and picture elements in the application of the cubic method and a hybrid bicubic method;

FIG. 16 is a table showing an application example of the cubic method;

FIG. 17 is a table showing an application example of the hybrid bicubic method;

DETAILED DESCRIPTION OF THE PREFERRED EMBODIMENTS

Figure 1:
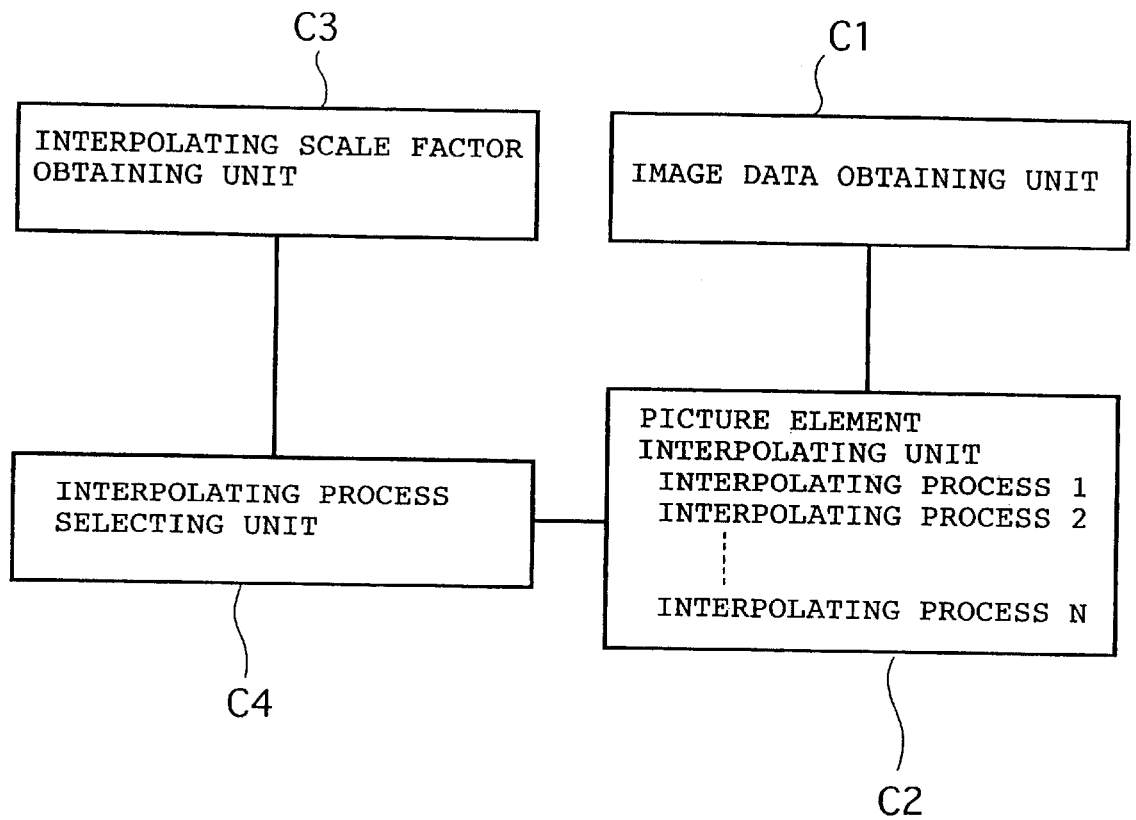
FIG. 1 is a schematic block diagram of an image data interpolation apparatus of one embodiment in accordance with the present invention.

An embodiment of the present invention will be described with reference to the drawings. Referring to FIG. 1, a basic arrangement of an image data interpolation apparatus in accordance with the invention is shown. When a digital processing is premised, an image is represented by dot-matrix picture elements. Image data is composed of number of data each indicative of the picture element. In a system for processing image data in the unit of picture elements, the image is scaled up and down in the unit of picture elements. The image data interpolation apparatus of the embodiment is provided for scaling up the image in the unit of picture elements. The device comprises an image data obtaining unit C1, a picture element interpolating unit C2, an interpolating scale factor obtaining unit C3, and an interpolating process selecting unit C4. The image data obtaining unit C1 obtains image data. The picture element interpolating unit C2 carries out an interpolating process for increasing the number of constituent picture elements of the obtained image data. The picture element interpolating unit C2 is capable of carrying out a plurality of interpolating processes. The interpolating scale factor obtaining unit C3 obtains a scale factor suitable for the obtained image data. The interpolating process selecting unit C4 selects one of the interpolating processes capable of obtaining an optimum result of interpolation according to the interpolating scale factor obtained by the interpolating scale factor obtaining unit C3. The interpolating process selecting unit C4 further instructs the picture element interpolating unit C2 to execute the selected interpolating process.

Figure 2:
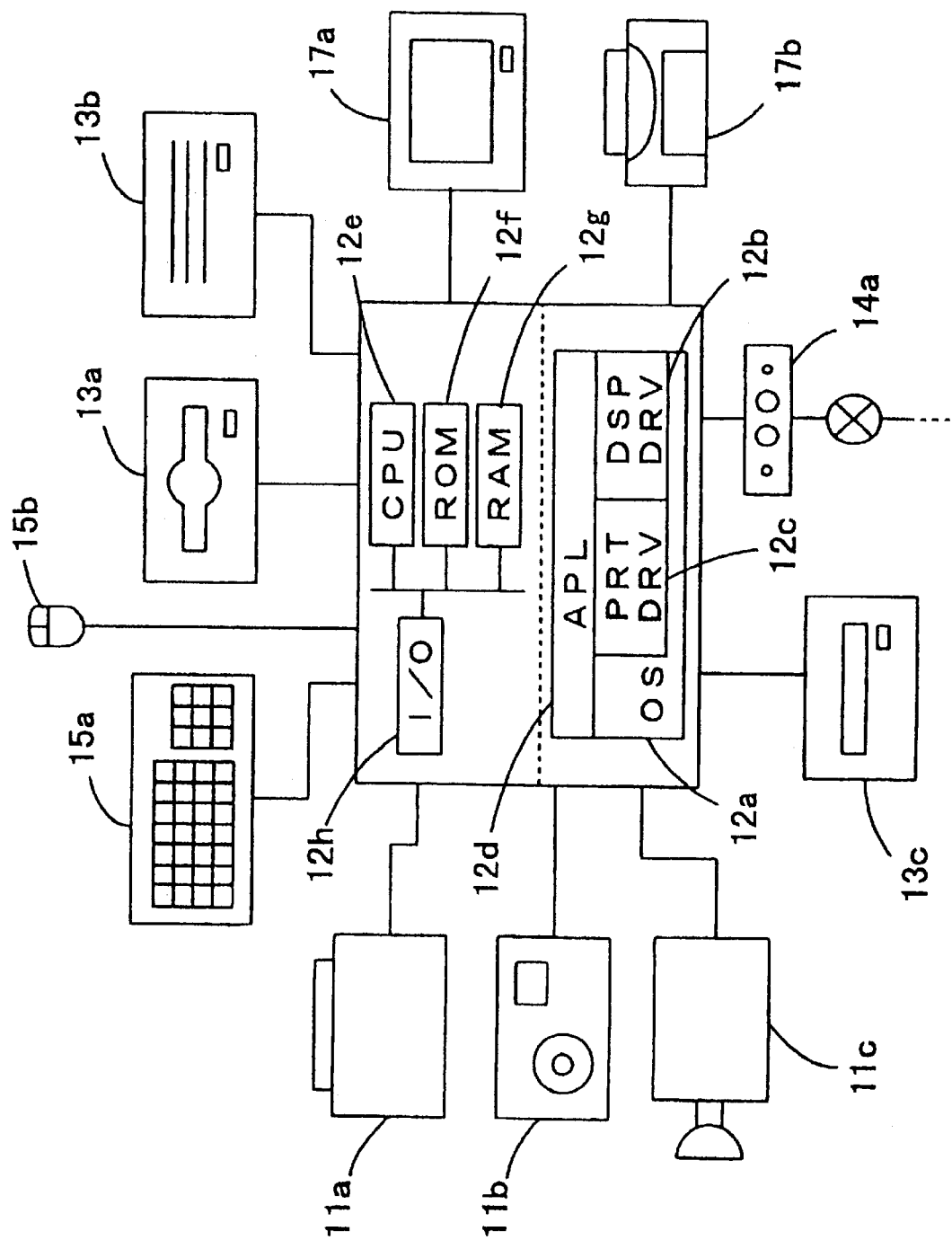
FIG. 2 is a block diagram of a specific hardware of the image data interpolation apparatus.

A concrete arrangement for accomplishing the aforesaid functions will be described. The embodiment employs a computer system 10 as an example of hardware accomplishing the above-mentioned image data interpolation apparatus. FIG. 2 shows the computer system in a block form. The computer system 10 comprises a scanner 11a, a digital still camera 11b and a video camera 11c each serving as an image input device. The scanner 11a, digital still camera 11b and video camera 11c are connected to a computer 12. Each image input device generates image data comprising dot-matrix picture elements, supplying the image data to the computer 12. The image data generated by each image input device is represented in three primary colors of RGB in 256 gradations so that about 16 million and 700 thousand colors can be represented.

A floppy disk drive 13a, a hard disk 13b and a CD-ROM drive 13c each serving as an external auxiliary storage are connected to the computer 12. Main programs relating to the system is recorded on the hard disk 13b. Other required programs are read from a floppy disk or a CD-ROM as the occasion may demand. Further, a modem 14a is connected to the computer 12. The modem 14a is further connected to an external network (not shown) via a public telecommunication line through which software and data can be downloaded. Although an operator externally accesses via the modem 14a and the public telecommunication line in the embodiment, a LAN adapter may be provided for the operator to access the network, instead. Additionally, a keyboard 15a and a mouse 15b are provided for operation of the computer 12.

The computer system 10 further comprises a display 17a and a color printer 17b each serving as an image output device. The display 17a has a display area of 800×600 picture elements in the horizontal and vertical directions respectively, so that about 16 million and 700 thousand colors can be displayed for every picture element. However, this is only one example of resolution. The resolution of the display 17a may be variable, for example, it may be 640× 480 or 1024×768 picture elements. On the other hand, the color printer 17b, which is of the ink-jet type, is capable of printing an image with dots on printing paper serving as a recording medium using four color inks of CMYK (cyan, magenta, yellow and black). The color printer 17b has an image density of 360×360 dpi or 720×720 dpi and can thus perform a high-density printing. The color printer 17b has two gradations as to whether color ink is applied or not.

Predetermined programs are executed in the computer 12 so that the image data input by the image input device is displayed or otherwise output by the image output device. Of these programs, an operating system (OS) 12a as a basic program runs on the computer 12. A display driver (DSP DRV) 12b and a printer driver (PRT DRV) 12c are incorporated in the operating system 12a. The display driver 12b instructs the display 17a to perform a displaying operation, whereas the printer driver 12c instructs the color printer 17b to perform a printing operation. These drivers 12b and 12c depend on the types of the display 17a and color printer 17b respectively and can accordingly be added or changed according to the respective types. Further, additional functions other than standard processes may be accomplished depending on the respective types of the display 17a and color printer 17b. In other words, various additional processes can be accomplished within allowable ranges while a common processing system is maintained on the standard system of the operating system 12a. The computer is provided with a CPU 12e, a RAM 12f, a ROM 12g and an I/O 12h to execute the aforesaid programs. The CPU 12e executes the basic program written on the ROM 12g while carrying out computation using the RAM 12f as a temporary work area or a setting storing area, or a program area, thereby controlling the external and internal equipment connected thereto.

The application 12d is executed on the operating system 12a serving as the basic program. The application 12d has various processing contents. For example, it monitors operations of the keyboard 15a and the mouse 15b each serving as an operating device. When each device is operated, the CPU 12e controls the external equipment so that the corresponding computation processing is carried out. The CPU 12e further displays the results of processing on the display 17a or outputs them to the color printer 17b.

In the above-described computer system 10, the scanner 11 serving as an image input device obtains image data. After a predetermined image processing is carried out for the image data by the application 12d, the image data is capable of being output to the display 17a and the color printer 17b. In this case, when a picture element density of the color printer 17b equals one of the scanner 11a, the size of an image to be printed becomes equal to the size of the scanned original image. However, when the picture element density of the color printer 17b differs from that of the scanner 11a, the size of the image to be printed also differs from that of the original image. The picture element density of the scanner 11a approximates that of the color printer 17b in many cases. However, when the color printer 17b has a picture element density improved for high image quality, it is often higher than the picture element density of an ordinary image input device. In particular, the improved picture element density of the color printer 17b is higher than that of the display 17a, whereupon a too small image is printed when the size of the image displayed on the display 17a is equal to that of the original image in the picture elements.

In view of the aforesaid problem, the operating system 12a determines a reference picture element density and executes a resolution conversion so that the difference between the reference density and the picture element density of an actual device is resolved. For example, when the display 17a has a resolution of 72 dpi and the operating system 12a has a reference density of 360 dpi, the display driver 12b executes the resolution conversion between them. Further, when the color printer has a resolution of 720 dpi under the same condition, the printer driver 12c executes the resolution conversion between them.

The resolution conversion is a process for increasing the number of constituent picture elements of the image data and accordingly corresponds to an interpolating process. Each of the display and printer drivers 12b and 12c has a function of executing the interpolating process. Each driver further accomplishes not only the above-described picture element interpolating unit C2 but also the interpolating scale factor obtaining unit C3 and the interpolating process selecting unit C4 as will be described later, so that the image quality is prevented from being deteriorated by the resolution conversion. Both of the display and printer drivers 12b and 12c are stored on the hard disk 13b and read into the computer upon start of the computer system 10 to run. When put to work, these drivers recorded on a medium such as a CD-ROM or a floppy disk are installed on the hard disk. Accordingly, such a CD-ROM or floppy disk constitutes a medium on which an image data interpolating program is recorded.

Figure 3:
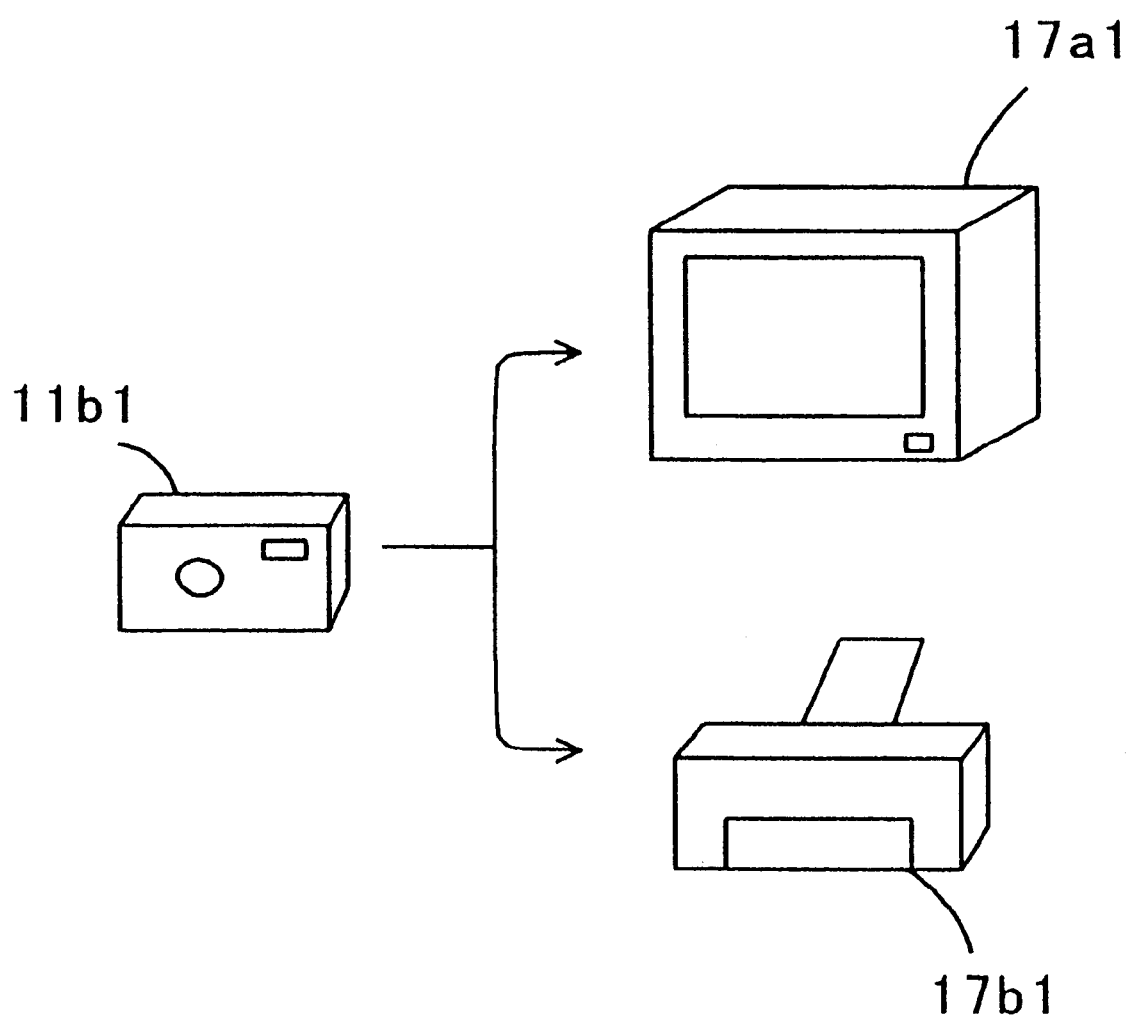
FIG. 3 is a schematic block diagram of another application example of the image data interpolation apparatus.
Figure 4:
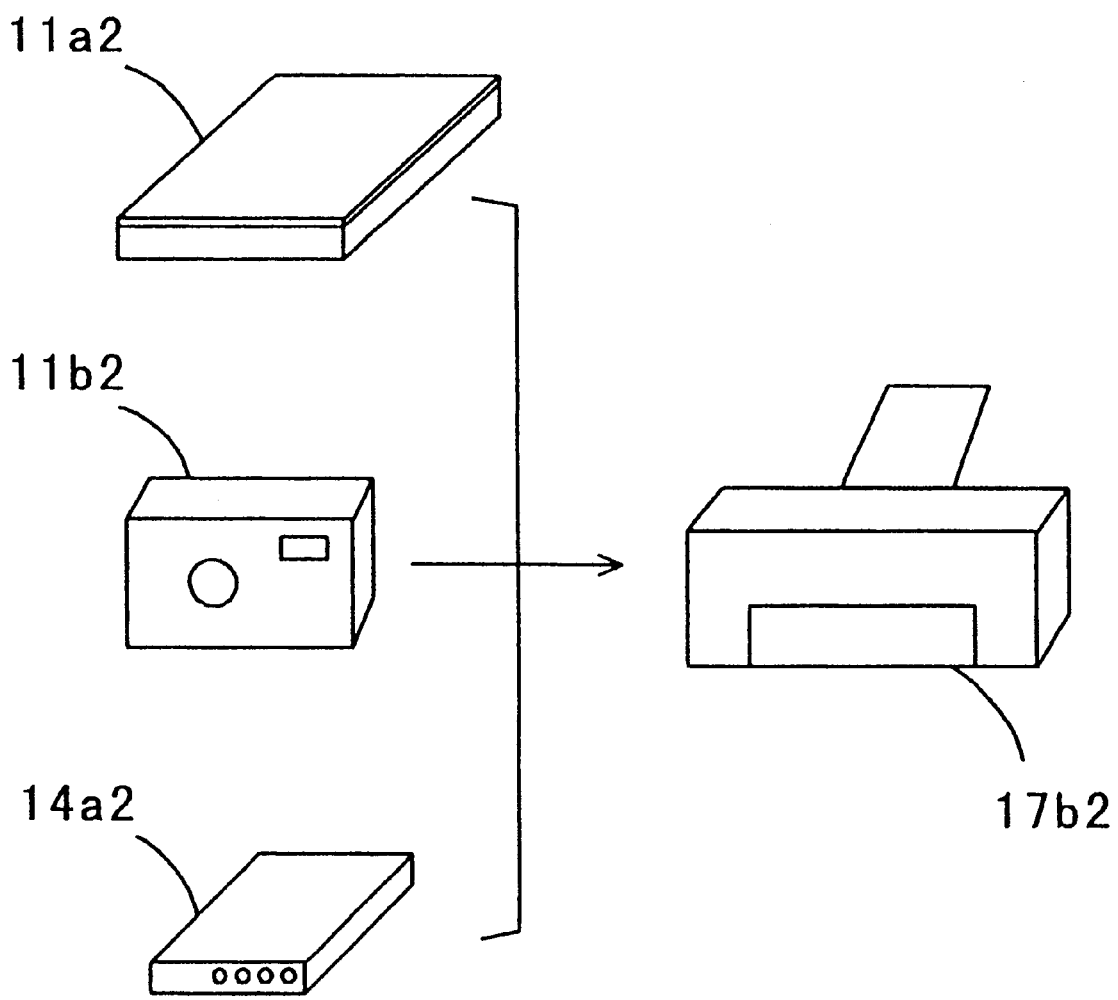
FIG. 4 is a schematic block diagram of further another application example of the image data interpolation apparatus.
Figure 5:
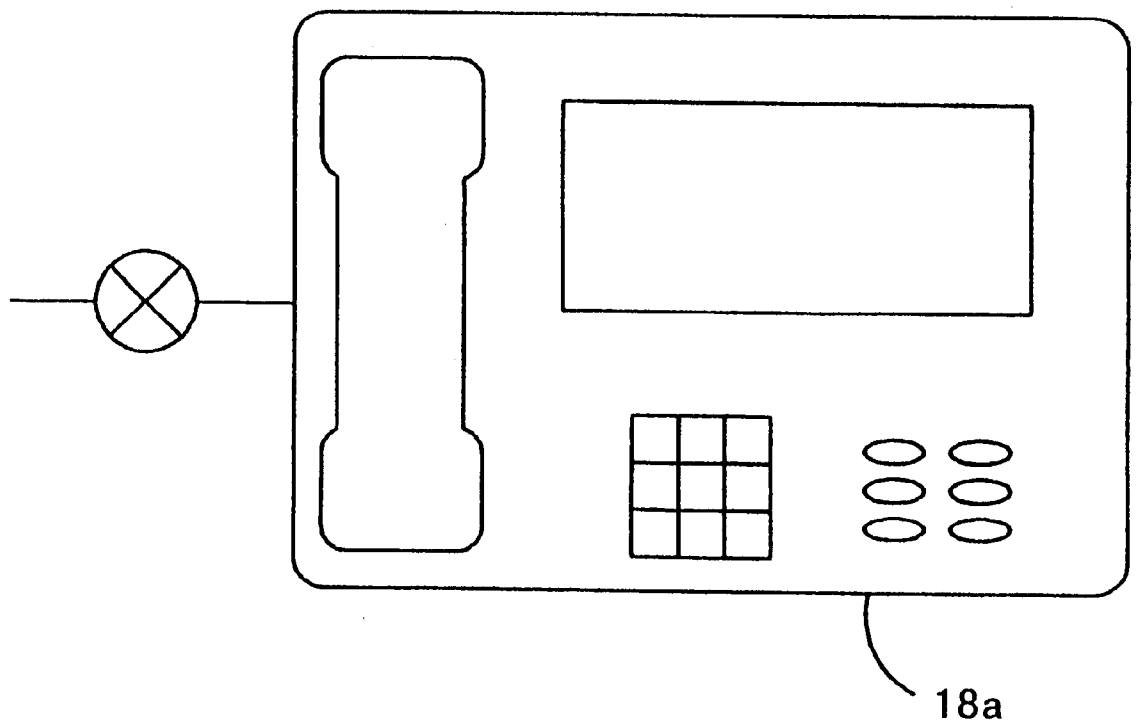
FIG. 5 is a schematic block diagram of further another application example of the image data interpolation apparatus.
Figure 6:
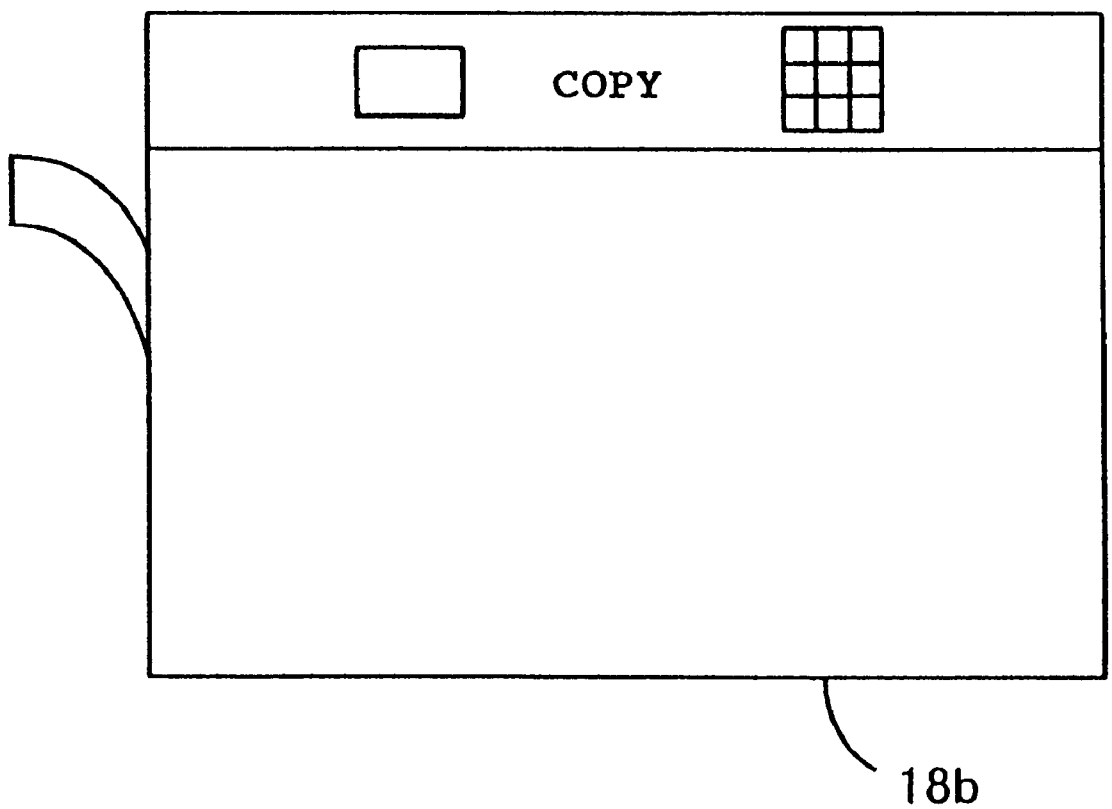
FIG. 6 is a schematic block diagram of further another application example of the image data interpolation apparatus.

Although the image data interpolating device is realized as the computer system 10 in the embodiment, the computer system is not necessarily required. A system in which the same interpolating process is required for image data may be provided, instead. For example, the image data interpolating device may be incorporated into a digital still camera 11b1 so that interpolated image data is displayed on a display 17a1 or printed by a color printer 17b1, as shown in FIG. 3. Further, in a color printer 17b2 inputting and printing image data without via a computer system, the resolution conversion may automatically be executed for image data input via a scanner 11a2, a digital still camera 11b2 or a modem 14a2 and a printing process may thereafter be carried out, as shown in FIG. 4. Additionally, the image data interpolation apparatus of the invention may be applied to equipment in which image data is treated, for example, a color facsimile machine 18a as shown in FIG. 5 or a color copying machine 18b as shown in FIG. 6.

Figure 7:
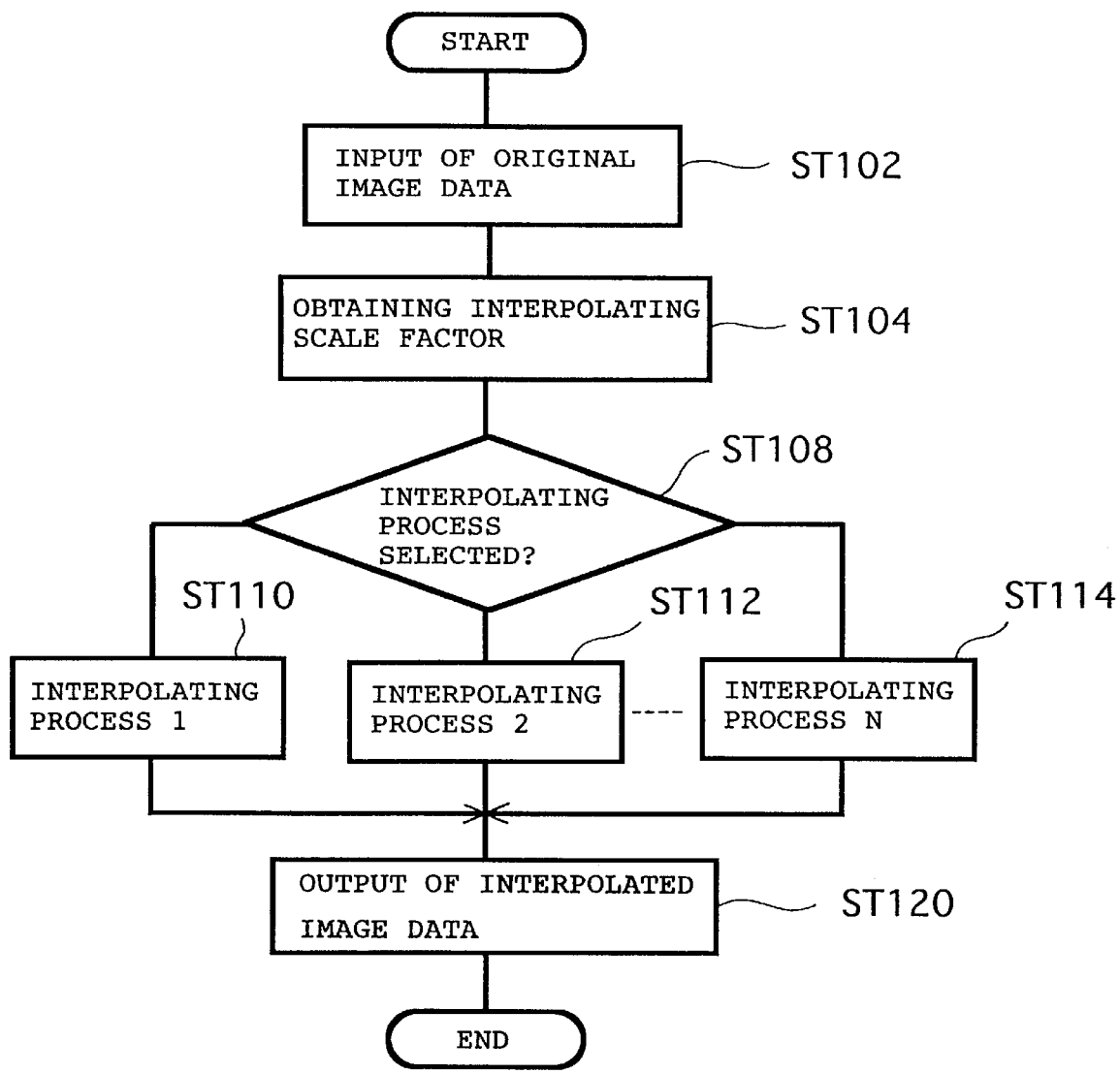
FIG. 7 is a schematic flowchart showing the operation of the image data interpolation apparatus.
Figure 8:
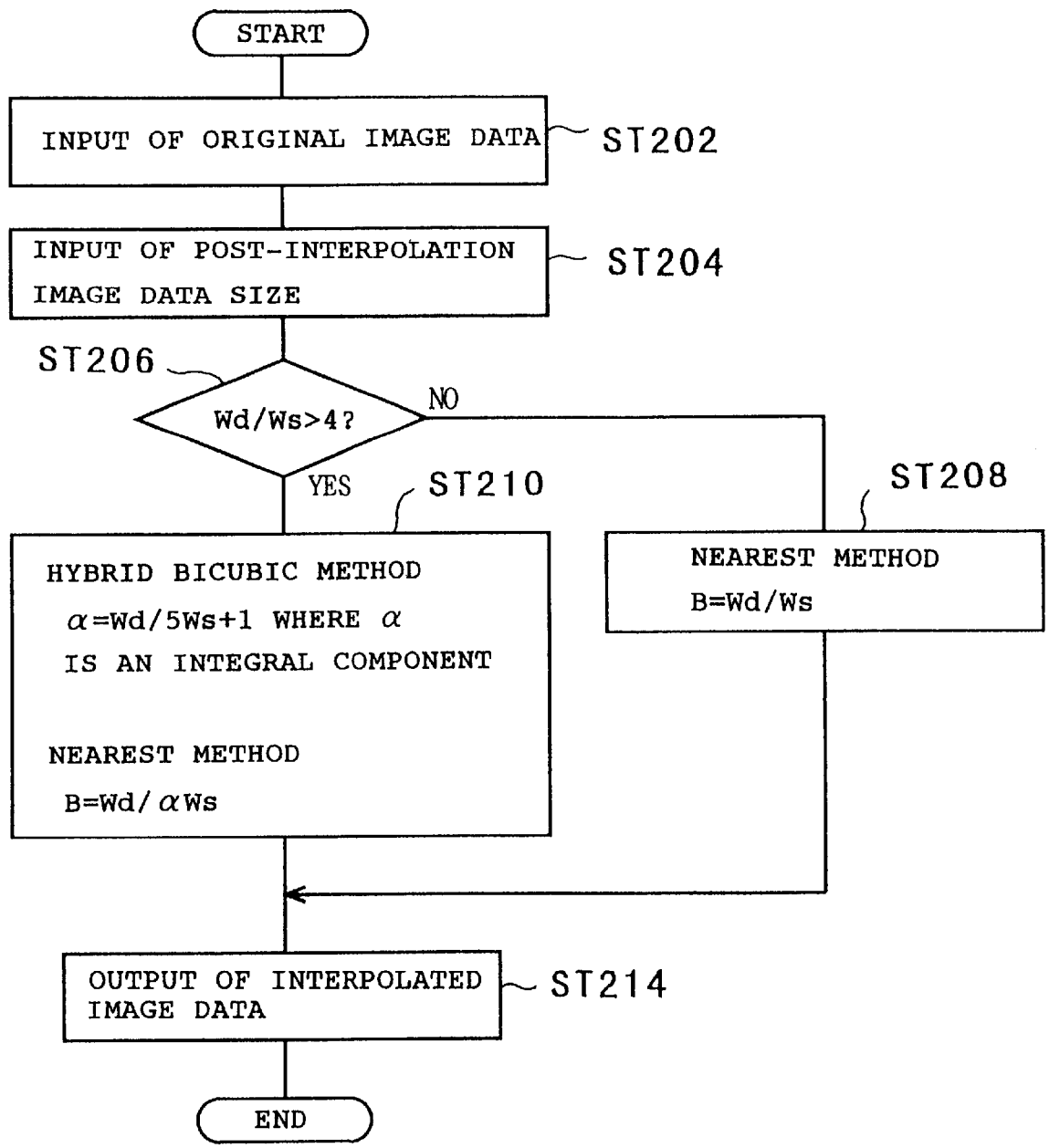
FIG. 8 is a flowchart more concretely showing the operation of the image data interpolation apparatus.

FIGS. 7 and 8 show processes for resolution conversion executed by the aforesaid printer driver 12c. FIG. 7 is a generalized flowchart, whereas FIG. 8 is a concrete flowchart showing the processing in the embodiment. Original image data is input at a step ST102. Input image is read from the scanner 11a on the application 12d. Predetermined image processing is carried out for the read image and thereafter, the image is processed for printing. Print data with a predetermined resolution is then delivered via the operating system 12a to the printer driver 12c. However, the image may be read by the scanner 11a, instead. This process corresponds to an image data obtaining step from the viewpoint of software. It can be understood that various steps executed by the computer including the image data obtaining step may not include the operating system 12a and hardware directly. On the other hand, these steps correspond to the image data obtaining unit C1 when considered to be integrally combined with hardware such as the CPU.

An interpolating scale factor is obtained for the read image data at a step ST104. This process for obtaining the interpolating scale factor will be described later. An optimum interpolating process for the image data according to a scale factor obtained at the step ST104 is selected at a step ST108, so that one of interpolating processes 1 to N at steps ST110, ST112, and ST114 respectively is executed. Accordingly, the step ST104 corresponds to an interpolating scale factor obtaining step, and each of the interpolating processes 1 to N at the respective steps ST110, ST112 and ST114 corresponds to an image interpolating step. Further, the step ST108 corresponds to an interpolating process selecting step wherein one of the interpolating processes is selected according to the interpolating scale factor. These steps constitute the image interpolating unit C2, the interpolating scale factor obtaining unit C3 and the interpolating process selecting unit C4 when considered to be integrally combined with hardware such as the CPU.

Upon completion of the interpolating process, the interpolated image data is output at a step ST120. Print data is not obtained only by the resolution conversion in the printer river 12c. A color conversion and a half-tone processing are further required. Accordingly, output of the image data means delivery of the image data to a next stage.

Figure 9:
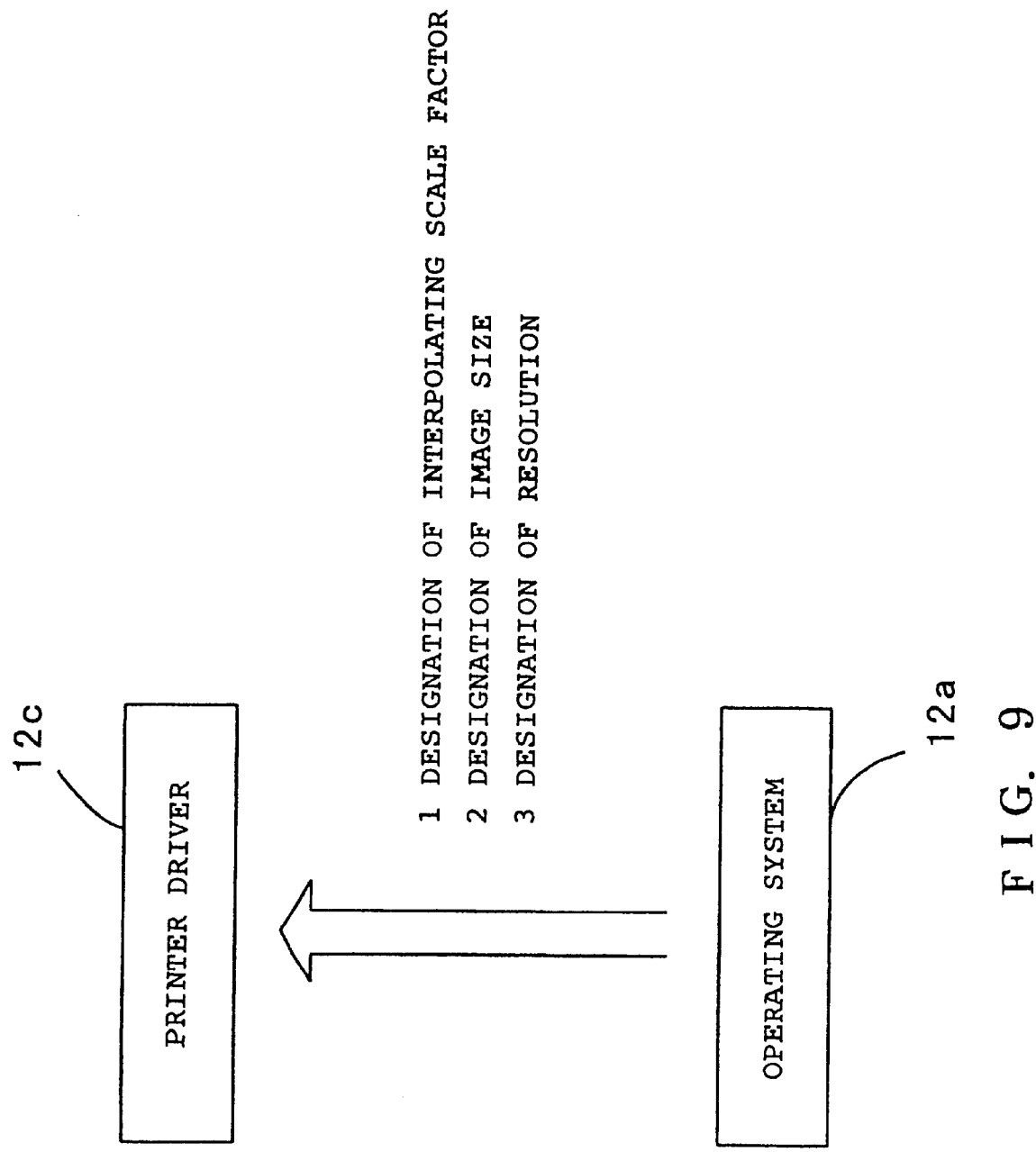
FIG. 9 illustrates a case where an operating system designates an interpolating scale factor to a printer driver.

A more concrete process will now be described with reference to FIG. 8. The original image data is input at a step ST202 in the same manner as in the step ST102. A post-interpolation image data size is input at a step ST204 for the purpose of obtaining an interpolating scale factor. Thus, the step ST204 corresponds to the step ST104. The interpolating scale factor obtaining unit will be described hereinafter. FIG. 9 shows an example in which the printer driver 12c obtains an interpolating scale factor, based on information supplied thereto from the operating system 12a. In a first example, the operating system 12a directly designates an interpolating scale factor to the printer driver 12a. The printer driver 12c obtains the designated interpolating scale factor in this case.

In a second example, the operating system 12a designates the size of an image to be printed with a unit of pixels. In this case, the printer driver 12c obtains an interpolating scale factor by computation, based on the designated image size. For example, when the original image data measures a length Ws by a width Hs in the pixels and the interpolation image data measure a length Wd by a width Hd in the pixels, the interpolating scale factor is represented as Wd/Ws or Hd/Hs on the assumption that an aspect ratio is not varied.

In a third example, the operating system 12a designates a resolution controlled thereby. In this case, the printer driver 12c computes a ratio of the designated resolution to a resolution of the color printer to thereby obtain an interpolating scale factor. For example, when the resolution controlled by the operating system 12c is 360 dpi and the resolution of the color printer is 720 dpi, the interpolating scale factor become "2."

In the embodiment, the resolution is obtained on the basis of the above-described second example. The post-interpolation image data size is input at the step ST204 as described above. Upon input of the interpolation image data size at the step ST204, it is determined at a step ST206 whether the interpolating scale factor exceeds "4," on the basis of the ratio of the interpolation image data size to the original image data size input at the step ST202. When the ratio does not exceed "4," an interpolating process at a step ST208 is executed. When the ratio exceeds "4," an interpolating process at a step ST210 is executed.

Figure 10:
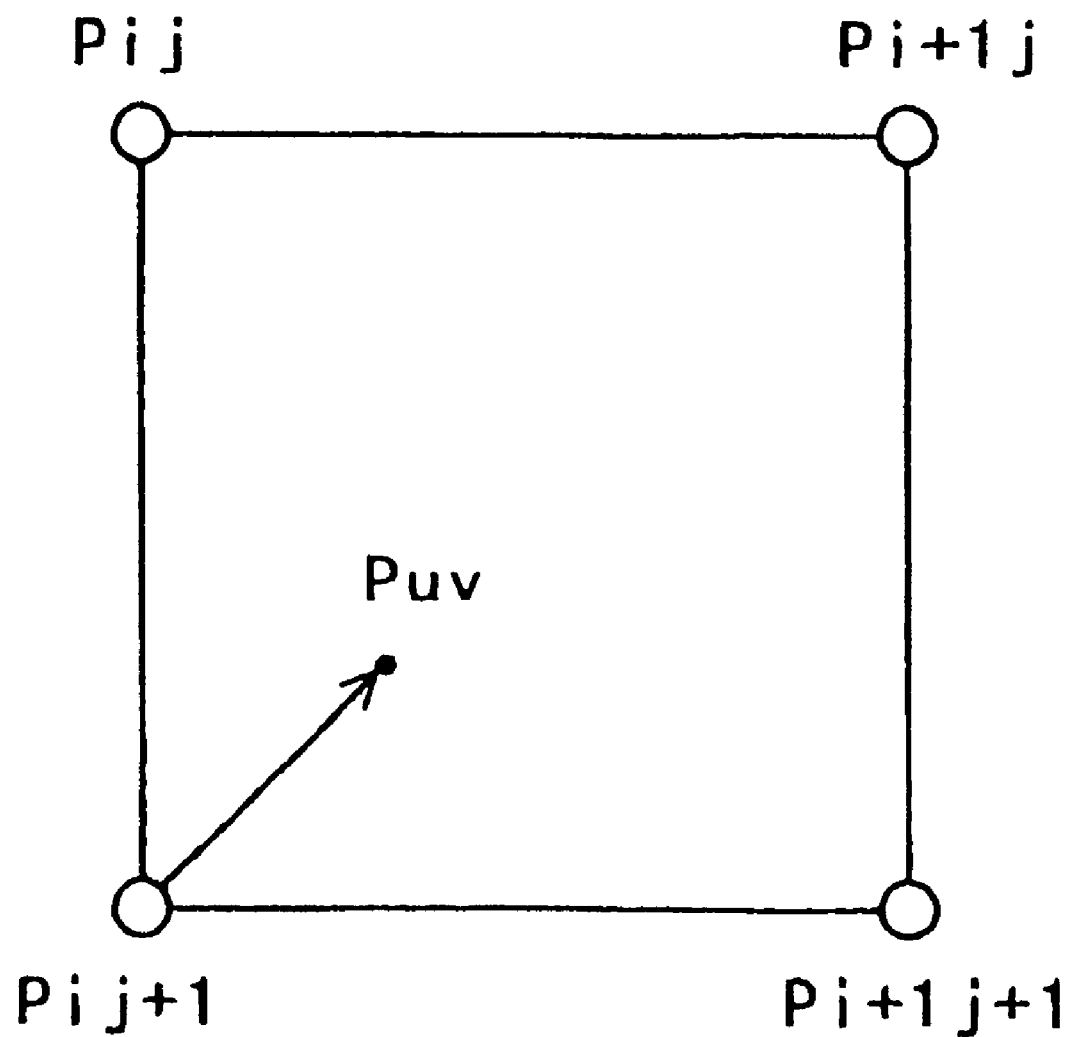
FIG. 10 illustrates a concept of the nearest method.

Methods of the interpolating process employed in the embodiment will now be described. The nearest method is suitable for a non-natural image such as computer graphics and has an exceedingly small amount of computation. In the nearest method, as shown in FIG. 10, distances between an interpolation point Puv and four peripheral lattice points Pij, Pi+1j, Pij+1 and Pi+1j+1 respectively are obtained. Data of the nearest lattice point is displaced to the interpolation point Puv. This is expressed by the following equation:

$$Puv=Pij$$

where i=[u+0.5] and j=[v+0.5], and each bracket indicates that an integral part is taken in the Gauss' notation.

Figure 11:
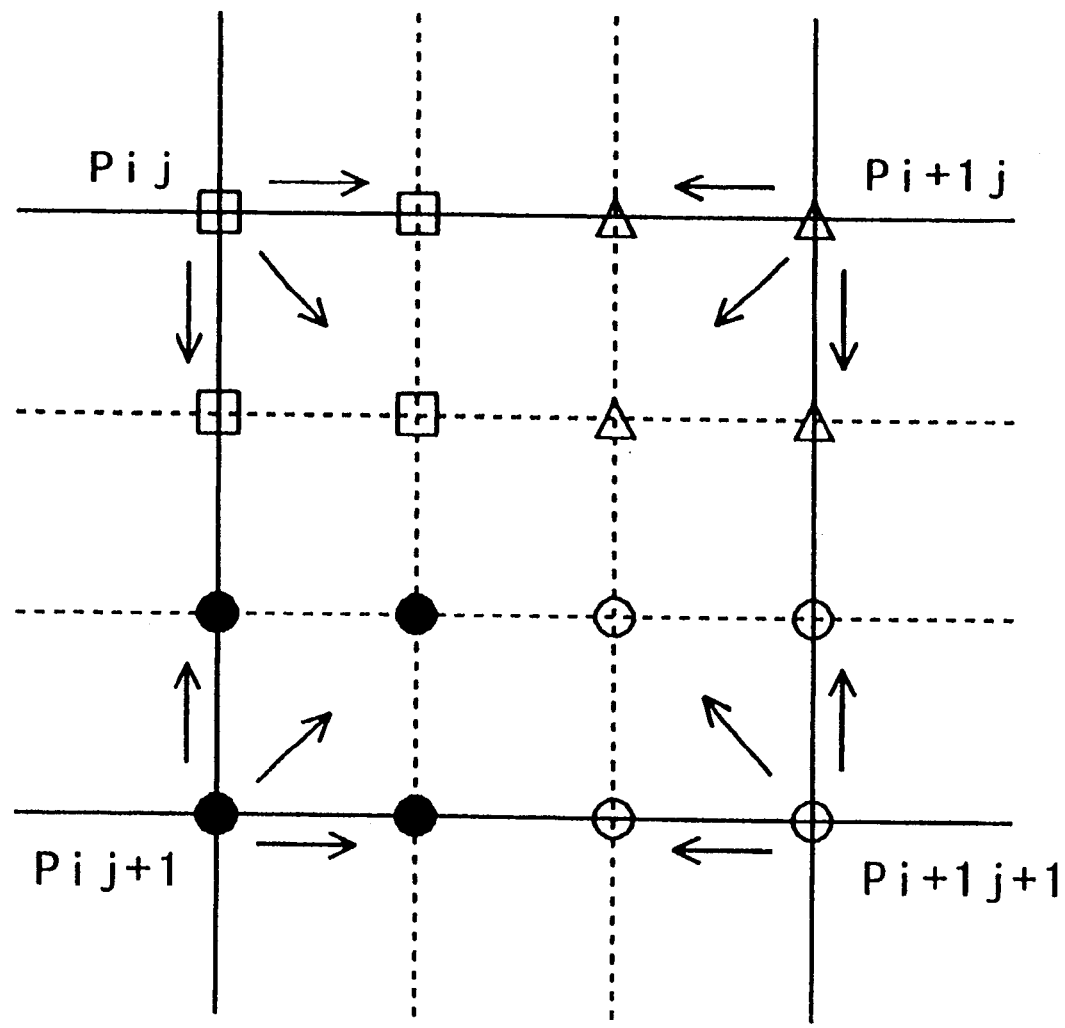
FIG. 11 illustrates a case where data of lattice points are displaced in the nearest method.
Figure 12:
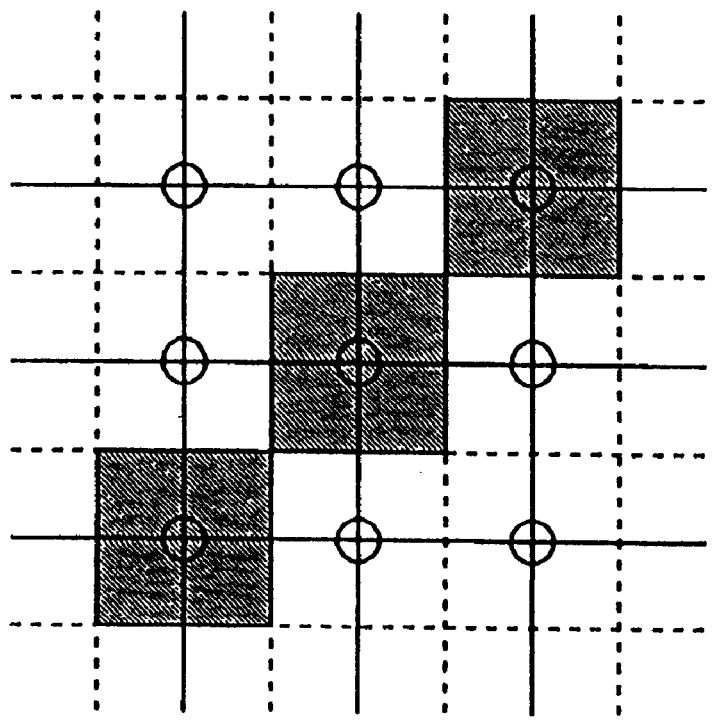
FIG. 12 is a schematic illustration of picture elements before interpolation by the nearest method.

FIG. 11 shows a case where the number of picture elements is trebled both in the length and the width by the nearest method. The aforesaid data of the nearest picture element is then displaced as a picture element to be interpolated. FIG. 12 shows the original image and FIG. 13 shows an image obtained by interpolating the picture elements in the above-described method. The relation between obliquely arranged black picture elements and white picture elements serving as the background in the original image is maintained in the interpolated image of FIG. 3 in which the black picture elements are trebled in the number thereof and arranged obliquely.

In the nearest method, edges of the original image are maintained in the interpolated image without change. Accordingly, when the interpolated image is scaled up, jags are conspicuous although the edges are maintained. However, since the data to be interpolated is the data of the lattice point, an amount of load in the computation is small. In other methods, on the other hand, the picture element to be interpolated is processed so as to be changed smoothly by using data of picture elements around it. As a result, although jags are less conspicuous, part of the information of the original data is cut off such that the image is rendered edgeless. Accordingly, these other methods are unsuitable for the computer graphics.

Figure 14:
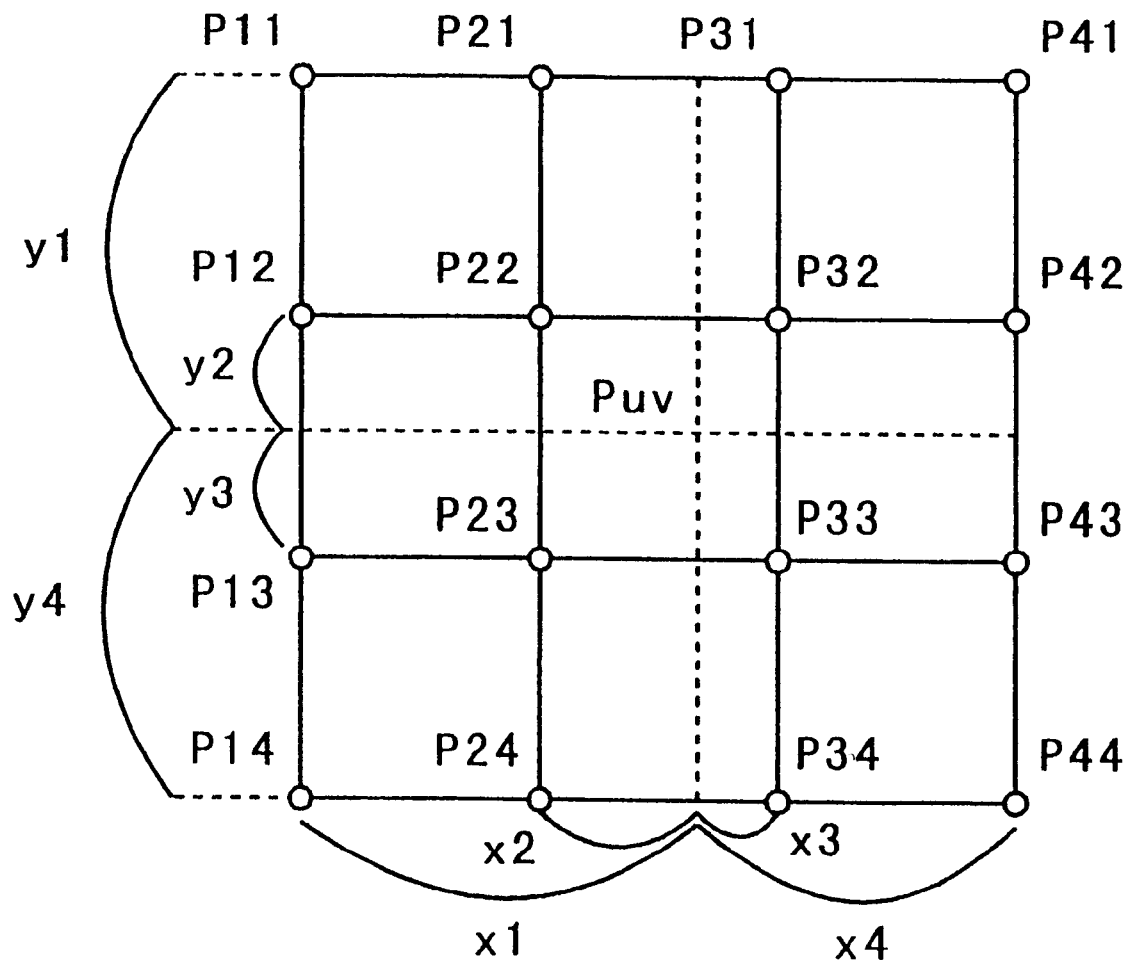
FIG. 14 illustrates a concept of the cubic method.

On the other hand, the cubic method is suitable for a natural image such as photographs and necessitates a large amount of computation. In the cubic method, as shown in FIG. 14, data of sixteen lattice points in total are used which include the point Puv to be interpolated, four lattice points P22, P23, P32 and P33 around the point Puv, and further outside lattice points surrounding the four lattice points. When the 16 lattice points surrounding the interpolation point Puv have respective values, the interpolation point Puv depends on the lattice points. For example, when the picture element is interpolated by a linear expression, two lattice points interposing the interpolation point Puv are weighted in inverse proportion to distances between the lattice points and the interpolation point and added. Note the X direction. In FIG. 14, reference symbol x1 designates a distance between the interpolation point Puv and the left-hand outer lattice points. Reference symbol x2 designates a distance between the interpolation point Puv and the left-hand inner lattice points. Reference symbol x3 designates a distance between the interpolation point Puv and the right-hand inner lattice points. Reference symbol x4 designates a distance between the interpolation point Puv and the right-hand outer lattice points. A function f(x) designates a degree of influence of each lattice point corresponding to each distance. Now, note the Y direction. Reference symbol y1 designates a distance between the interpolation point Puv and the upper outer lattice points. Reference symbol y2 designates a distance between the interpolation point Puv and the upper inner lattice points. Reference symbol y3 designates a distance between the interpolation point Puv and the lower inner lattice points. Reference symbol y4 designates a distance between the interpolation point Puv and the lower outer lattice points. A function f(y) designates a degree of influence of each lattice point according to each distance.

Each of the sixteen lattice points thus contributes to the interpolation point Puv with the degree of influence according to the above-described distance therebetween. Accordingly, an equation for accumulating the degrees of influence in the X and Y directions with respect to the data of all lattice points is expressed as follows:

$$P = [f(y1)\ f(y2)\ f(y3)\ f(y4)] \begin{pmatrix} P11 & P21 & P31 & P41 \\ P12 & P22 & P32 & P42 \\ P13 & P23 & P33 & P43 \\ P14 & P24 & P34 & P44 \end{pmatrix} \begin{pmatrix} f(x1) \\ f(x2) \\ f(x3) \\ f(x4) \end{pmatrix}$$

The degree of influence according to the distance is expressed by a cubic convolution function as:

$$f(t) = \{\sin(\pi t)\}/\pi t.$$

Each of the distances x1 to x4 and y1 to y4 is obtained using an absolute coordinate value (u, v) of the interpolation point Puv as:

$$x1 = 1 + (u - |u|) \quad y1 = 1 + (v - |v|)$$
$$x2 = (u - |u|) \quad y2 = (v - |v|)$$
$$x3 = 1 - (u - |u|) \quad y3 = 1 - (v - |v|)$$
$$x4 = 2 - (u - |u|) \quad y4 = 2 - (v - |v|)$$

On the above assumption, the aforesaid equation is expanded as follows:

$$P = [f(y1)\ f(y2)\ f(y3)\ f(y4)]$$

$$\begin{pmatrix} P11 \cdot f(x1) + P21 \cdot f(x2) + P31 \cdot f(x3) + P41 \cdot f(x4) \\ P12 \cdot f(x1) + P22 \cdot f(x2) + P32 \cdot f(x3) + P42 \cdot f(x4) \\ P13 \cdot f(x1) + P23 \cdot f(x2) + P33 \cdot f(x3) + P43 \cdot f(x4) \\ P14 \cdot f(x1) + P24 \cdot f(x2) + P34 \cdot f(x3) + P44 \cdot f(x4) \end{pmatrix}$$

=f(y1){P11-f(x1)+P21-f(x2)+P31-f(x3)+P41-f(x4)} +f(y2){P12-*f(x1)*+P22-*f(x2)*+P32. f(x3)+P42. f(x4)} +f(y3){P13-*f(x1)*+P23*f(x2)+P33-f(x3)+P43-f(x4)} +f(y4){P14-*f(x1)*+P24-f(x2)+P34-f(x3)+P44-f(x4)} =P11.f(x1)-f(y1)+P21ef(x2)-f(y1)+P31. f(x3)-f(y1)+P41of(x4)-f(y1) +P12-*f(x1)*-*f(y2)*+P22. f(x2)-f(y2)+P32-f(x3)ef(y2)+P42ef(x4)-f(y +P13-*f(x1)*\*f(y3)*+P23-f(x2)-f(y3)+P33-f(x3)-f(y3)+P43-f(x4+P14-*f(x1)*-*f(y4)*+P24-f(x2)-f(y4)+P34-f(x3)-f(y4)+P44-f(x4)-f(y4

The degree of influence f(t) is approximated by the following cubic equation:

$$f(t) = \{\sin(\pi t)\}/\pi t$$

$$\approx \begin{cases} 1 - 2|t|2 + |t|3: & 0 \le |t| < 1 \\ 4 - 8|t| + 5|t|2 - |t|3: & 1 \le |t| < 2 \\ 0: & 2 \le |t| \end{cases}$$

In this cubic method, the degree of influence varies gradually as it approaches from one lattice point to the other lattice point. The cubic method has a characteristic that this variation of the influence degree becomes cubic.

FIGS. 15 and 16 show an example in which the picture element is interpolated by the cubic method. For the purpose of easy understanding, data about the vertical direction is not employed and edges appear in the horizontal direction in the example. Further, three picture elements are to be interpolated in the example. First, numeric values in FIG. 16 will be described. The left-hand headings, "ORIGINAL" denotes gradation values of the picture elements before interpolation. Four picture elements P0, P1, P2 and P3 each having a gradation value of "64" are arranged. Five picture elements P5, P6, P7, P8 and P9 each having a gradation value of "192" are arranged. One picture element P4 having a gradation value of "128" is interposed between the picture elements P3 and P5. The picture element with the gradation value of "128" corresponds to the edge.

When three picture elements Pn1, Pn2 and Pn3 are interpolated between the picture elements, the distance between the interpolated picture elements is 0.25. The aforesaid distances x1 to x4 are shown in the middle part of the table. Functions f(x1) to f(x4) are computed with the respective distances x1 to x4. For example, when the distances x1, x2, x3 and x4 are "1.25," "0.25," "0.75" and "1.75," the function f(t) is about "−0.14," "0.89," "0.30" and "−0.05," respectively. Further, when the distances x1 to x4 are "1.50," "0.50," "0.50" and "1.50," the function f(t) are about "−0.125," "0.625," "0.625" and "−0.125," respectively. When the distances x1 to x4 are "1.75," "0.75," "0.25" and "1.25," the function f(x) are about "−0.05," "0.30," "0.89" and "−0.14," respectively. Gradation values of the interpolation points are computed on the basis of the above-described results. Results of computation are shown in the right-hand column of FIG. 16 under the headings, "Cubic" and also in the graph of FIG. 15, which graph will be described later.

The computation is simplified when it is assumed that the data about the vertical direction does not vary. With reference only to data (P1, P2, P3 and P4) of the four horizontally arranged lattice points, the degree of influence according to the distance between the interpolation point and each lattice point is computed as follows:

$$P = P1 \cdot f(x1) + P2 \cdot f(x2) + P3 \cdot f(x3) + P4 \cdot f(x4).$$

Accordingly, when the influence degree is computed with respect to the interpolation point P21, $$P21 = 64 * f(1.25) + 64 * f(0.25) + 64 * f(0.75) + 128 * f(1.75)$$
$$= 64 * (-0.14063) + 64 * (0.890625) + 64 * (0.296875) +$$
$$128 * (-0.04688)$$
$$= 61$$

Since the influence degree f(t) is expressed as the cubic function in the cubic method, the quality of result of interpolation can be varied by adjusting the shape of a curve thereof. As an example of adjustment, $0 < t < 0.5$  $f(t) = -(8/7)t^{}3 - (4/7)t^{}2 + 1$ $0.5 < t < 1$  $f(t) = (1-t)(10/7)$ $1 < t < 1.5$  $f(t) = (8/7)(t-1)^{}3 + (4/7)(t-1)^{}2 - (t31\ 1)$ $1.5 < t < 2$  $f(t) = (3/7)(t-2)$ This will be referred to as "hybrid bicubic method."

FIG. 17 shows results of interpolation by the hybrid bicubic method. In this example, the same model as employed in the cubic method is used. FIG. 15 also shows the results of interpolation by the hybrid bicubic method. In this example, the cubic curve is rendered slightly steep such that the whole image becomes sharp.

Figure 18:
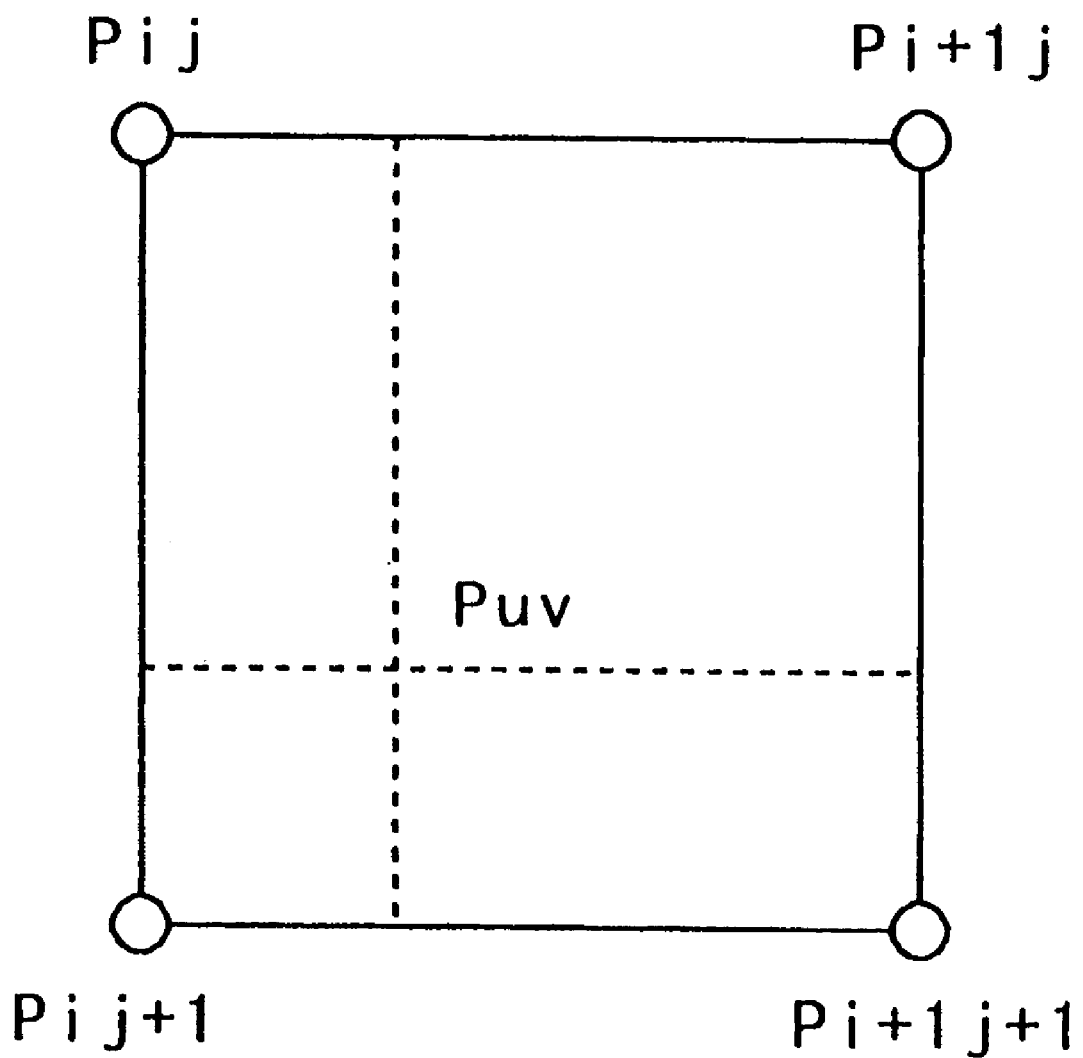
FIG. 18 illustrates a concept of a bilinear method.

Another interpolation method will be described in order that the characteristics of the above-described nearest, cubic and hybrid bicubic methods may be understood. Here, a bilinear interpolation method will be described. Referring to FIG. 18, the bilinear method is similar to the cubic method in that the influence degree varies gradually as it approaches from one lattice point to the other lattice point. However, the bilinear method differs from the cubic method in that the variation is linear and depends upon only data of the lattice points at the opposite sides. More specifically, a region defined by the four lattice points Pij, Pi+1j, Pij+1 and Pi+1j+1 surrounding the interpolation point Puv is divided by the interpolation point into four subdivisions. Diagonally located data is weighted on the basis of area ratios among the subdivisions. This is expressed as the following equation:

$P = \{(i+1)-u\}\{(j+1)-v\}pij$ $+\{(i+1)-u\}\{v-j\}Pij+1$ $+\{u-i\}\{(j+1)-v\}Pi+1j$ $+\{u-i\}\{v-j\}Pi+1j+1$ where i=[u] and j=[v].

Figure 19:
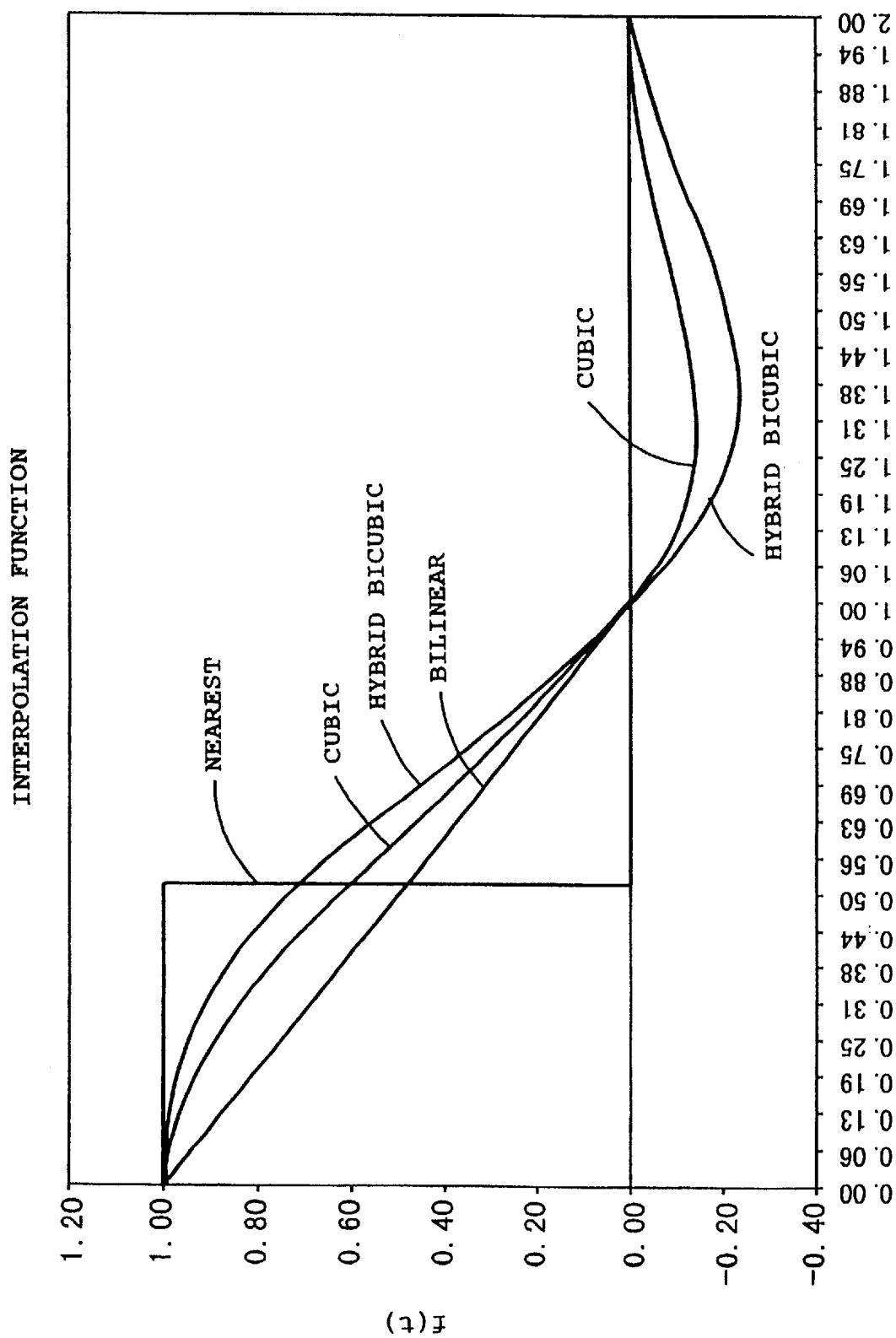
FIG. 19 is a graph showing changes in interpolation functions.

In each of the two cubic methods and the bilinear method, the influence degree varies gradually as it approaches from one lattice point to the other lattice point. However, the variation is cubic in the two cubic methods, whereas the variation is linear in the linear method. This difference is large. FIG. 19 shows the two-dimensional results of interpolations by the nearest, cubic, hybrid bicubic and bilinear methods. The axis of abscissas denotes a location and the axis of ordinates denotes an interpolation function corresponding to the above-described influence degree according to the distance between the interpolation point and each lattice point. The lattice points exists at locations where t=0, t=1 and t=2, respectively. The interpolation points are at locations where t=0 and 1.

In the bilinear method, the interpolation function varies linearly between adjacent points (t=0 and 1). As a result, since marginal portions are smoothed, a resultant image is blurred on the screen. More specifically, when the marginal portions differ from corner portions and are smoothed, an original contour of the image is lost in the case of computer photographics, and the image becomes out of focus in the case of photograph.

On the other hand, in the cubic methods, the interpolation function gradually approximates the lattice point between the adjacent points (t=0 and 1), generating an upward convexity. Further, the interpolation function becomes downwardly concave between adjacent points (t=1 and 2). In other words, one edge portion is varied so as to have such a difference as not to produce a step. As a result, the sharpness is increased and no step is produced in the photograph. Further, the hybrid bicubic method increases sharpness of the image. An amount of computation is large in the cubic method and becomes large as an interpolating scale factor and accordingly the number of picture elements to be interpolated are increased more.

When much importance is laid on the quality of image, the cubic function such as the cubic method may be selected. However, the balance between a processing speed and the image quality is important in the computer. In other words, a tolerance in the decrease of the processing speed becomes large according to the degree of improvement of the image quality. However, a high-speed processing is sometimes preferred even if an amount of improvement in the image quality is slight or the image quality is slightly degraded.

The aforesaid methods can easily be understood with reference to FIGS. 15 and 16 showing concrete values together with the above-described comparison of interpolation functions. Note the picture element P3 with the gradation value of 64, the picture element P4 with the gradation value of 128 and the picture element P5 with the gradation value of 192 in FIG. 15. A technique for simply linearly connecting between the lattice points is the bilinear method. On the other hand, an S-shaped curve is formed in the case of the cubic method, and the S-shaped curve is rendered steeper in the hybrid bicubic method. The S-shaped curve is directed in such a direction that the variation in the gradation value of the picture element is rendered steeper, whereupon the edge is emphasized. Further, an overshoot and an undershoot are produced in the regions (P2 and P3, P5 and P6) adjacent the edge picture element. A difference of elevation between the sides interposing the edge picture element is increased as the result of the undershoot at a lower side and the overshoot at an upper side. Accordingly, it can be understood that the edge is emphasized by these two factors. Further, it can easily be understood that whether an image appears sharp depends on a central inclination in the S-shaped curve. Additionally, the difference of elevation resulting from the undershoot and the overshoot also affects the sharpness of the image.

FIG. 8 shows a case where importance is laid on the processing speed. The interpolating process is basically executed by the nearest method. The hybrid bicubic method is carried out when necessary. More specifically, it is determined at a step ST206 whether the interpolating scale factor exceeds "4." When the scale factor does not exceed "4," the interpolating scale factor β is determined to be Wd/Ws and the interpolating process by the nearest method is executed at a step ST208. On the other hand, when the interpolating scale factor exceeds "4," the interpolating process only by the nearest method renders jags conspicuous, resulting in a reduction in the image quality. In view of this, when it is determined at the step ST206 that the interpolating scale factor exceeds "4," the interpolating process by the hybrid bicubic method is first executed for enlargement by means of multiplication by a predetermined integer, and a remaining part of the interpolation is executed by the nearest method. Thus, the enlargement is carried out by the hybrid bicubic method, and the multiplication by the predetermined integer is performed in the interpolating process. As a result, an amount of computation can be decreased.

Figures 20A, 20B:
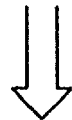
FIGS. 20A and 20B schematically illustrate an interpolating process with an integer scale factor.

The interpolating process can be executed with any scale factor both in the hybrid bicubic method and in the cubic method. However, when the multiplication by an integer is accepted in the interpolating process, the number of picture elements to be interpolated is decreased such that the processing speed can be increased. FIG. 20 shows an example of interpolating process in which the number of picture elements is doubled both in the horizontal and vertical directions. When a variable region is previously secured for image data after the interpolation, image data of an original image is converted by the interpolating process of multiplication by any integer into image data composed of picture elements having coordinate values corresponding to those of the original image multiplied by the integer. In the shown example, old coordinate values (0, 0) correspond to new coordinate values (0, 0) and old coordinate values (1, 0) correspond to new coordinate value (2, 0). Old coordinate values (0, 1) correspond to new coordinate values (0, 2) and old coordinate values (1, 1) correspond to new coordinate values (2, 2). Accordingly, image data is generated according to the aforesaid interpolating process with respect only to the remaining coordinate values. In this case, the direction of width of the image data may be a primary scanning direction and the direction of length of the image data may be a second scanning direction, so that the image data is scanned in this order.

Further, the interpolating process may be executed for coordinate values in each block defined by four lattice points.

Thus, the interpolating process of multiplication by the integer is executed by the hybrid bicubic method without an increase in the amount of computation and thereafter, the interpolating process is executed by the nearest method with respect to the remaining interpolating scale factor β=Wd/(α*ws).

Now, the following is a description of a load of each interpolating process in a case where an image of VGA size (640 ×480) is printed into a 2L print size. The size of an original image data is expressed by Ws=640 pixels and Hs=480 pixels. The 2L print size as the size of the interpolated image data is 16 cm×12 cm or 6.299 inches×4.724 inches. When a final resolution is 720 dpi, the size of the interpolated image data in the pixels is obtained as Ws=4535, Hs=3401 pixels. Then, the whole scale factor Wd/Ws is obtained as 4536/640=7.0875.

The determination at the step ST206 is intended to reduce the interpolating scale factor by the nearest method to or below "4" so that jags are prevented. When the whole scale factor exceeds "4," the interpolating process is executed by the nearest method and the hybrid bicubic method. In order that the hybrid bicubic method of multiplication by an integer may be carried out, interpolation of at least scale factor of "2" needs to be executed. In order that the whole scale factor Wd/Ws may exceed "4" and the scale factor remaining in the first stage of the interpolation may not exceed "4," at least one quarter of the whole scale factor or more needs to be executed in the first stage. Accordingly, $$\alpha=(Wd/Ws)\times 1/4=Wd/4Ws.$$

When some allowance is added to the interpolation by the nearest method, the interpolating scale factor α is expressed as:

$$\alpha=Wd/5Ws.$$

In this case, however, the interpolating scale factor becomes only one time as large as that before interpolation. Since the interpolating scale factor needs to be at least doubled, the interpolating scale factor is expressed as follows:

$$\alpha=Wd/5Ws+1.$$

Fractions are omitted. Then, the interpolating scale factor a by the hybrid bicubic method is expressed as follows:

$$Wd/5Ws+1=4536/(5*640)+1=2.4175.$$

Accordingly, α=2 as an integral part. The interpolating scale factor β of the nearest method is obtained as:

$$\beta=Wd/\alpha Ws=4536/(2*640)=3.54375.$$

The interpolated image data is delivered to a next stage at a step ST214 when the whole interpolating process is performed by any one of the interpolating processes for new coordinate values. However, an amount of interpolated image data sometimes becomes excessively large or a memory area assigned to the printer driver 12c is not sometimes large. In these cases, the interpolated image data may be divided so that each subdivision data may be output.

Figure 21:
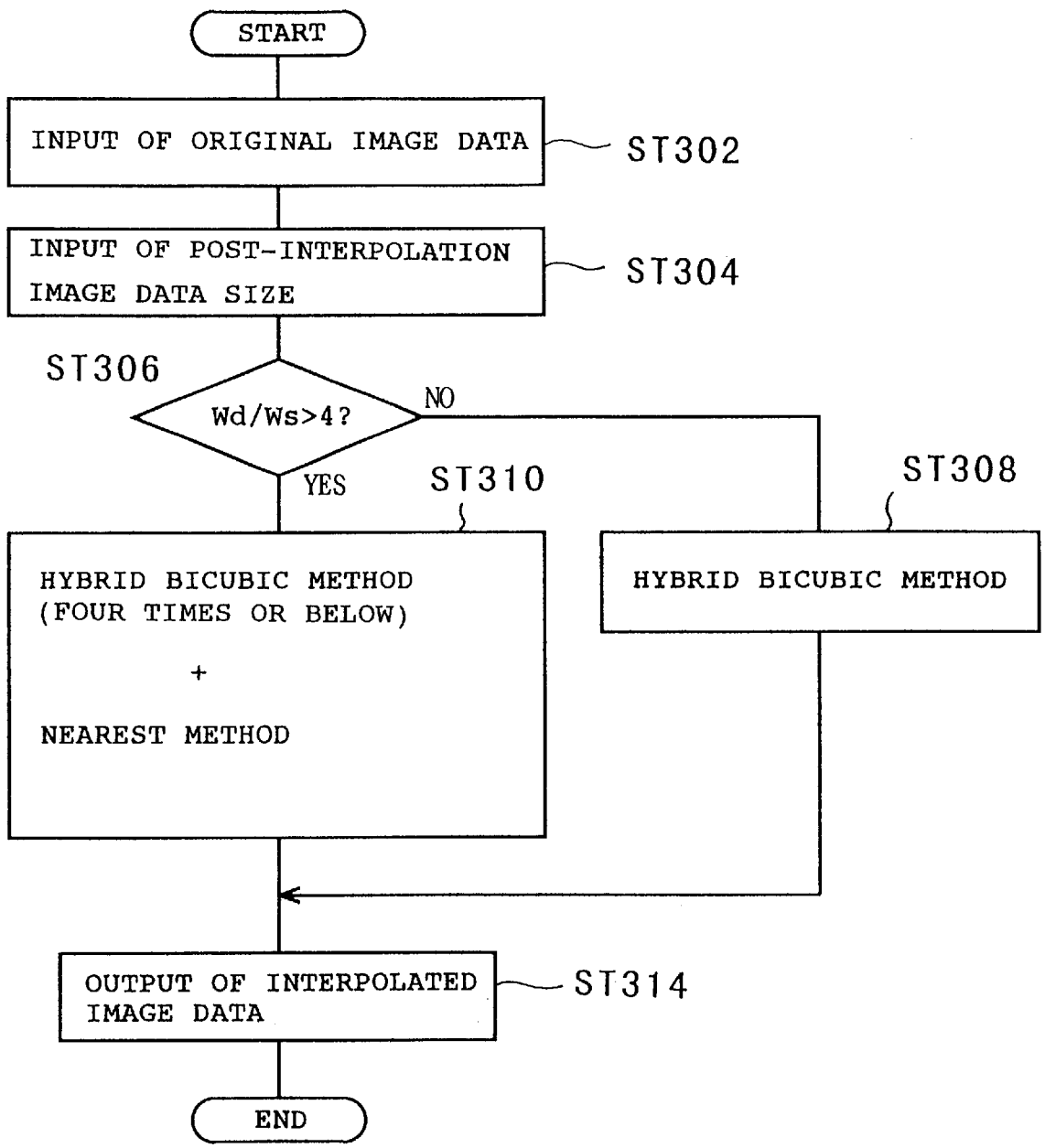
FIG. 21 is a flowchart of another interpolating process.

Thus, the importance is laid on the processing speed in the interpolation shown in the flowchart of FIG. 8. However, the interpolation in which importance is laid on the image quality is possible. FIG. 21 shows one example of such an interpolation. The interpolation in FIG. 21 differs from that in FIG. 20 in that the interpolating process carried out in a step ST308 is the hybrid bicubic method but not the nearest method. Thus, the interpolation shown in FIG. 21 is a process in which the importance is laid on the image quality in the meaning that execution of the hybrid bicubic method improves results of interpolation in the case of natural images. However, an amount of load of computation is large in the hybrid bicubic method. Accordingly, an amount of computation becomes enormous when the whole interpolation is executed by the hybrid bicubic method even in a case where the interpolating scale factor is large. In view of the enormous amount of computation, the interpolating process is executed by the hybrid bicubic method until the interpolating scale factor becomes "4" and thereafter, the nearest method is carried out for the interpolating process exceeding the interpolating scale factor of "4," so that a rapid increase in the amount of computation is prevented.

In the above-described example, a plurality of interpolating processes are carried out when the interpolating scale factor has increased to or above a predetermined value. However, the interpolating processes need not be successively performed. Different interpolating processes may be prepared for predetermined interpolating scale factors, instead. Since the curve can be adjusted in the cubic method as described above, a plurality of adjusting parameters may be provided according to the interpolating scale factors so that the difference in the parameters varies the results of interpolation although the interpolating process is the cubic method.

According to the above-described embodiment, the computer system 10 includes the scanner 11a serving as the image input device and the color printer 17b serving as the image output device. In the computer system 10, the printer driver 12c inputs the original image data at the step ST202 and further inputs the size of the interpolation image data at the step ST204. The printer driver 12c further obtains the interpolating scale factor at the step ST206 and executes the interpolating process only by the nearest method at the step ST208. Alternatively, the printer driver 12c executes the interpolating process by the hybrid bicubic method and the interpolating process by the nearest method successively. Consequently, an optimum result of interpolation can easily be achieved according to the interpolating scale factor.

The present invention should not be limited to the above embodiment. The following modifications fall within the scope of the invention. First, the image data represents an image as dot-matrix picture elements in the foregoing embodiment. However, any data representing each picture element may be used. The image may be a color image or a monochrome image. Further, the gradation value may be binary or multiple.

The image data obtaining unit is provided for obtaining the image data. The image data obtaining unit may only hold the image data to be interpolated when the picture element interpolating unit carries out the interpolating process for increasing the number of picture elements composing the image. Accordingly, a manner for obtaining the image data is not limited to the one described above but various obtaining manners may be employed. For example, the image data may be obtained via an interface from external equipment. Further, a photographing unit may be provided for photographing the image. Additionally, a computer graphics application may be executed so that the image data is input from a mouse or a keyboard.

The picture element interpolating unit is provided to be selectable one of a plurality of interpolating processes by various manners. Thus, the picture element interpolating unit may only be provided with options achieving different results of interpolation. Accordingly, all the options need not be individual interpolating manners. After the picture elements are first interpolated by one interpolating process, another interpolating process may be executed successively. In this case, two individual interpolating processes provide three options including these individual processes and a process in which the individual processes are successively executed.

The results of the interpolation achieved from the interpolating processes according to the interpolating scale factors may differ from each other. As one example, the picture element interpolating unit carries out one interpolating process when the interpolating scale factor takes a predetermined value. On the other hand, when the interpolating scale factor exceeds the predetermined value, the picture element interpolating unit carries out one interpolating process until the interpolating scale factor reaches the predetermined value. The picture element interpolating unit carries out another interpolating process for the remaining interpolating scale factor. In this case, the one interpolating process is carried out when the interpolating scale factor is at or below the predetermined value. When the interpolating scale factor exceeds the predetermined value, the another interpolating process is successively carried out. Accordingly, this processing manner is suitable for a case where an interpolating process achieving good results of interpolation but accompanying a large amount of computation when the interpolating scale factor is large is first carried out and another interpolating process not achieving good results of interpolation but accompanying a smaller amount of computation is carried out when an amount of computation exceeds an allowable limit. Thus, the remainder of the interpolating scale factor is compensated by a different interpolating process when the interpolating scale factor becomes large. Consequently, when the interpolating process carried out for the remainder of the interpolating scale factor is set to have a smaller amount of computation, a rapid increase in the amount of computation can be prevented even when the interpolating scale factor becomes large.

Further, in another example, the picture element interpolating unit carries out one interpolating process when the interpolating scale factor is at or below the predetermined value. When the interpolating scale factor exceeds the value, the picture element interpolating unit carries out another interpolating process until the interpolating scale factor reaches the predetermined value. The one interpolating process is carried out for the remainder of the interpolating scale factor. In this case, the one interpolating process is basically carried out. When the interpolating scale factor exceeds the predetermined value, the another interpolating process is previously carried out. Thus, when an amount of computation is small but the interpolating scale factor becomes large, one interpolating process achieving poor results of interpolation is ordinarily used only when the interpolating scale factor is large, another interpolating process achieving good results of interpolation but increasing an amount of computation is carried out prior to the one interpolating process. Consequently, this manner is suitable for a case where proper results of interpolation are achieved. Thus, a high-precision interpolating process is previously carried out when the ordinarily used interpolating process cannot achieve good results of interpolation due to a high interpolating scale factor. Consequently, a rapid reduction in the interpolation results can be prevented when the interpolating scale factor becomes large.

Various manners of obtaining the interpolating scale factor may be employed. As one example, a designated scale factor may be obtained when the image data obtaining unit obtains the image data. Further, the scale factor may be obtained on the basis of a ratio of the size of the image data obtained by the image data obtaining unit to the size of the post-interpolation image data. In the former case, an interpolating scale factor is designated when the image data obtaining unit obtains the image data, so that the interpolating scale factor obtaining unit obtains the designated scale factor. Thus, the interpolating scale factor is designated in this manner. On the other hand, the interpolating scale factor is not designated in the latter case. In this case, when the size of the post-interpolation image data is obtained, the ratio of the size of the image data before interpolation to the size of the image data after interpolation is calculated so that the scale factor is obtained. In a case where the size of the image after interpolation is informed as information necessary for the interpolation, the interpolating scale can be calculated if the ratio of the image size before interpolation to the image size after interpolation is found. Since the designated interpolating scale factor is obtained in the former case, the obtaining process can be simplified. In the latter case, the interpolating scale factor can easily be obtained on the basis of the sizes of image data before and after interpolation without designation of the interpolating scale factor.

Figure 22:
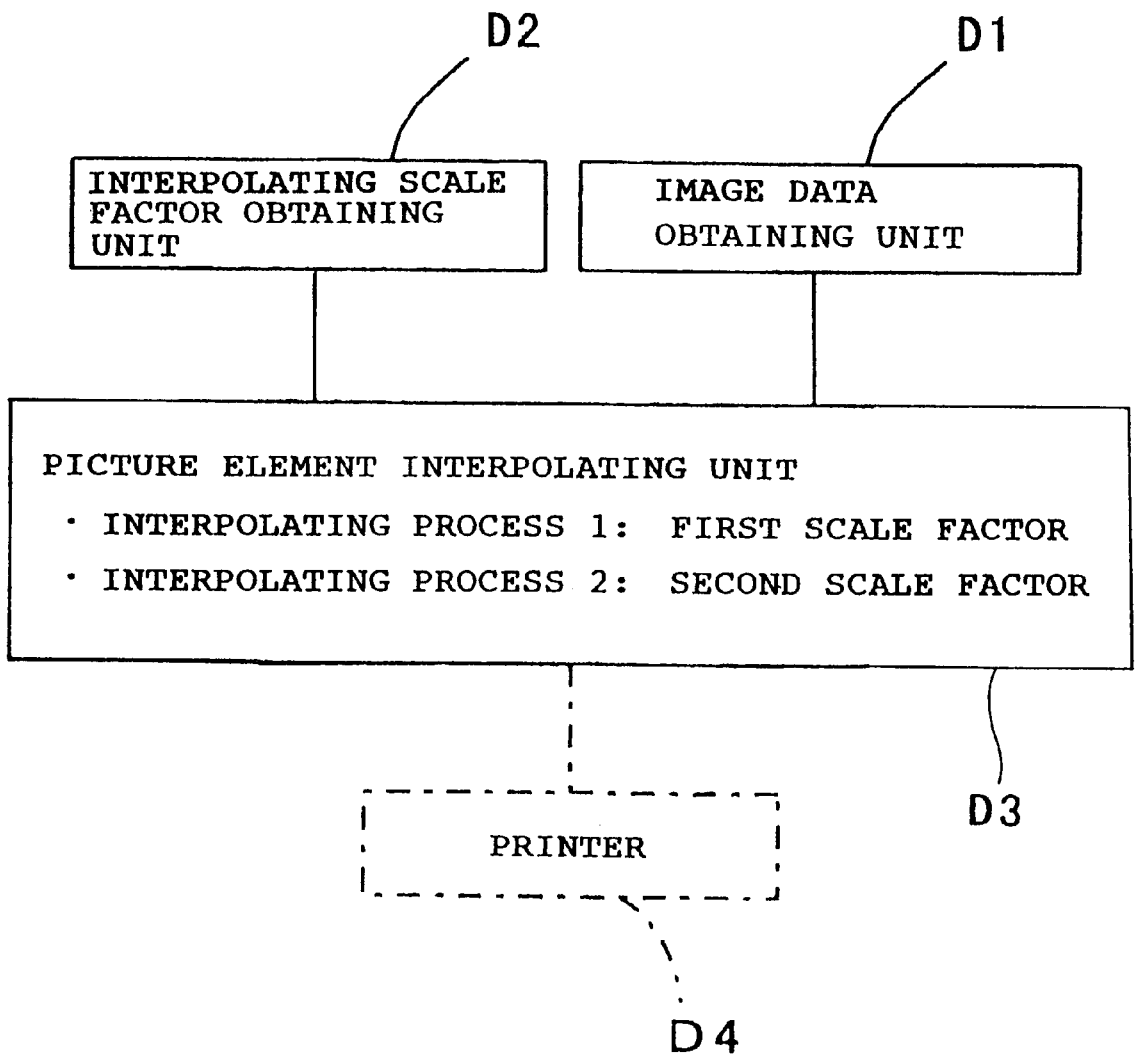
FIG. 22 is a schematic block diagram of further another application of the image data interpolation apparatus.
Figure 23:
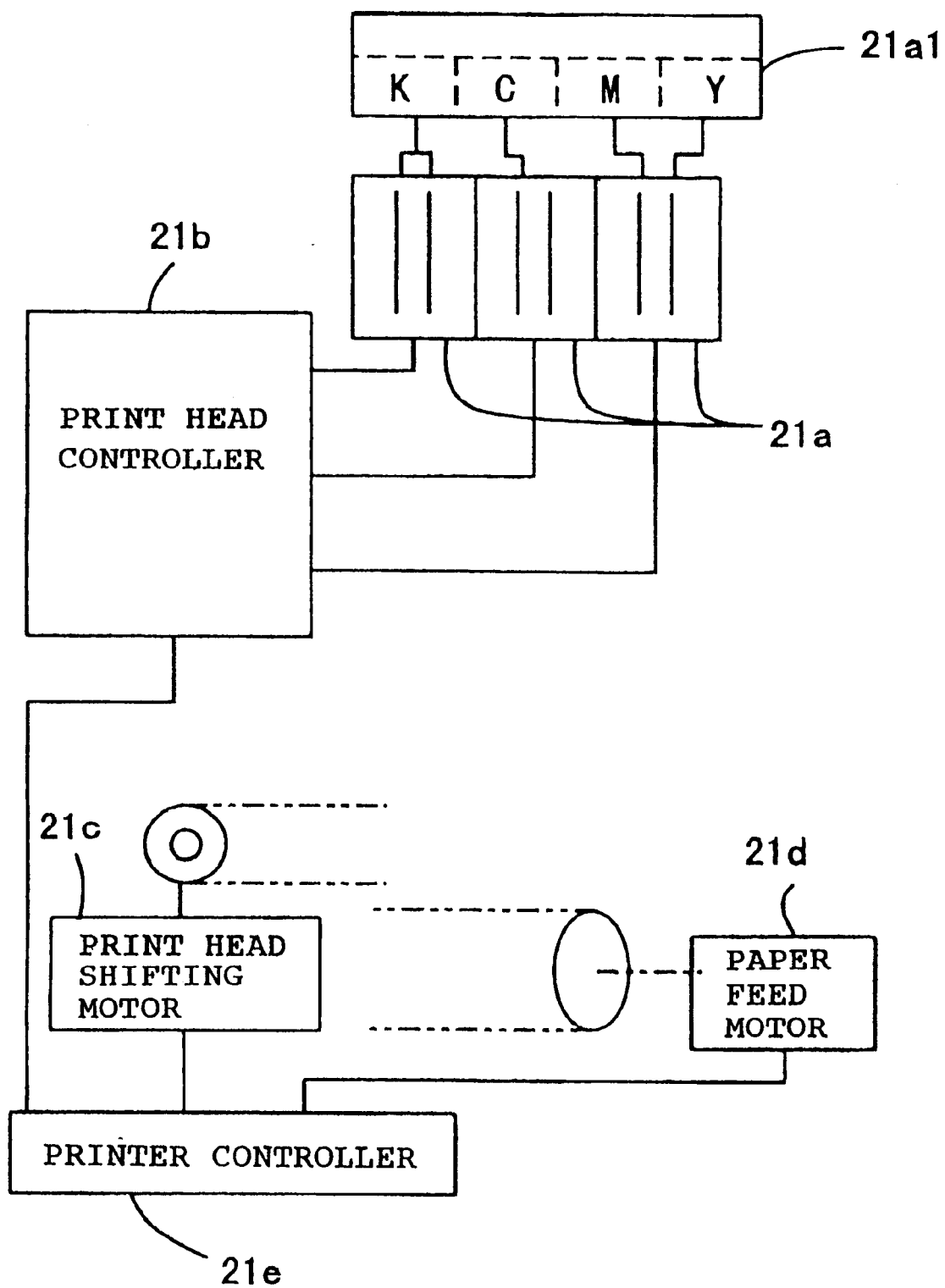
FIG. 23 is a schematic block diagram of an ink-jet type color printer.

Another embodiment will be described in which a plurality of interpolating processes are carried out with respective optimum interpolating scale factors when the interpolating processes are successively carried out. FIG. 22 shows an image data interpolating apparatus of the embodiment. The image data interpolating apparatus comprises an image data obtaining unit D1, an interpolating scale factor obtaining unit D2, and a picture element interpolating unit D3. The image data obtaining unit D1 obtains the image data. The interpolating scale factor obtaining unit D2 obtains an interpolating scale factor based on the difference between the resolution of the image data and the resolution of the printer. The picture element interpolating unit D3 carries out an interpolating process for increasing the number of constituent picture elements in the obtained image data. In this case, the obtained interpolating scale factor is divided into a first integer scale factor and a second remaining scale factor. Different interpolating processes are successively carried out with the use of the first and second scale factors respectively. Particularly printing results of color image can be improved in the embodiment.

Results of processing by the application 12d or print data is delivered via the printer driver 12c to the color printer 17b. The color printer 17b makes dots on printing paper using color inks, thereby printing an image.

FIGS. 23 to 25B illustrate a schematic construction of a color ink-jet printer 21 serving as the color printer. The color ink-jet printer 21 comprises a print head 21a including three print head units, a print head controller 21b controlling the print head 21a, a print head shift motor 21c shifting the print head 21a, a paper feed motor 21d feeding printing paper in the direction of lines, and a dot printing mechanism including a printer controller 21e serving as an interface between the print head controller 21b, the print head shift motor 21c and the paper feed motor 21d, and an external equipment. The color ink-jet printer 21 is capable of printing image with the print head 21a scanning over the recording medium such as printing paper according to the print data.

Figure 24A:
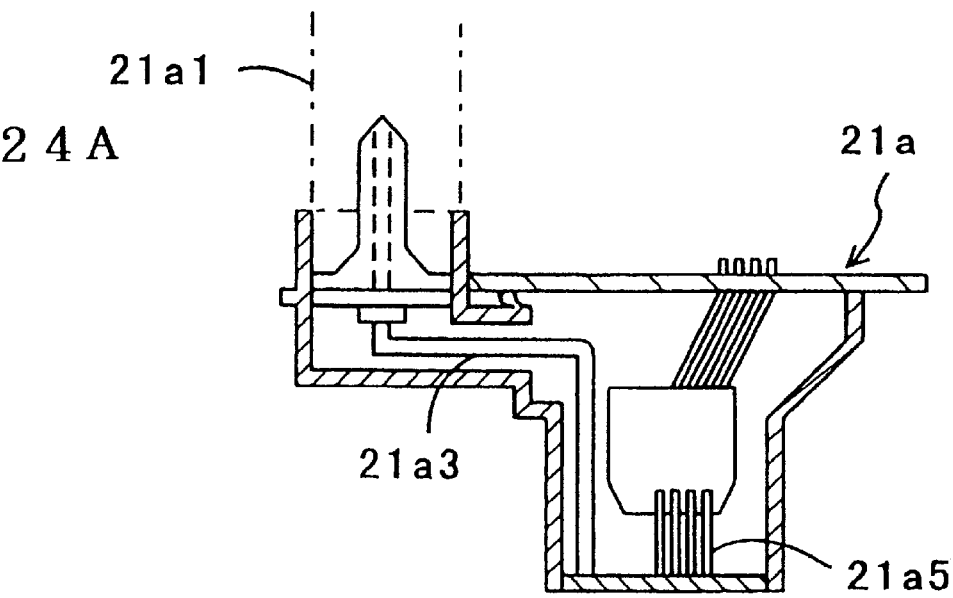
FIGS. 24A and 24B schematic sectional view and perspective view of a print head unit of the ink-jet type color printer respectively.
Figure 24B:
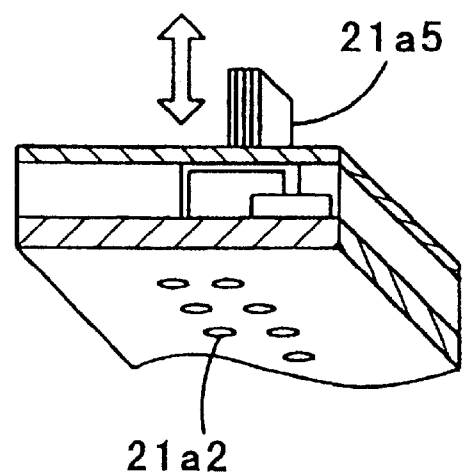
Figure 25A:
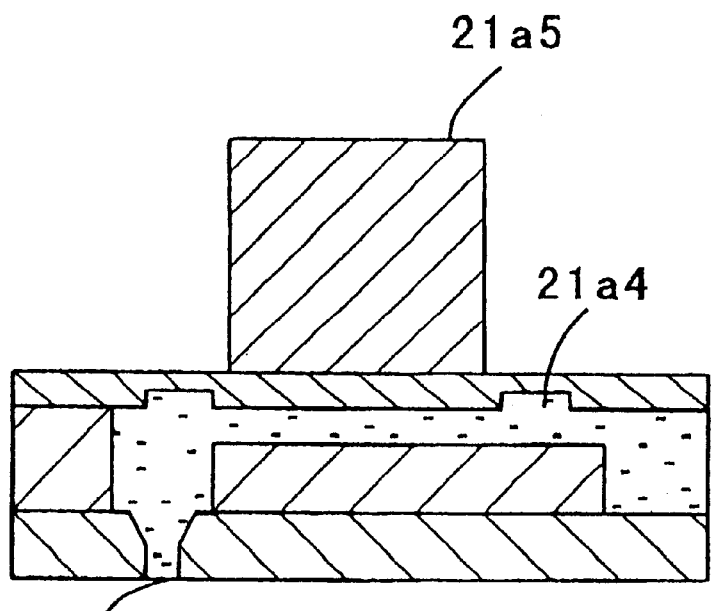
FIGS. 25A and 25B illustrate a case where a color ink is discharged from the print head unit.
Figure 25B:
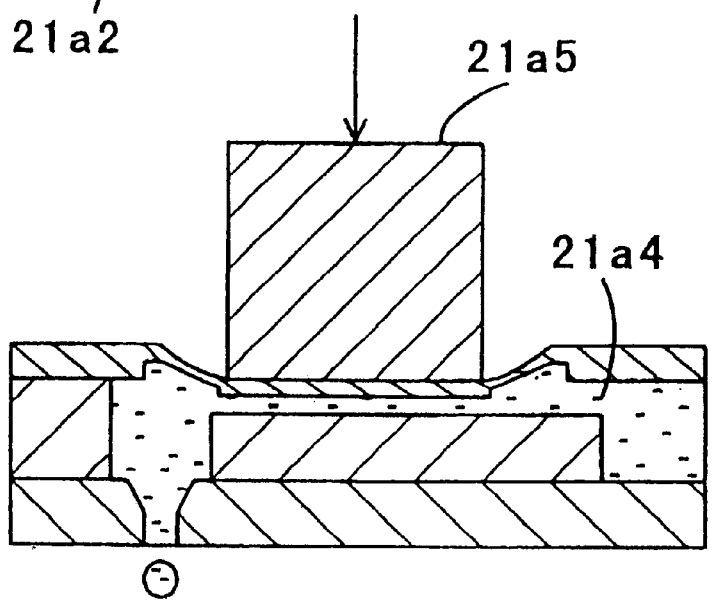
Figure 26A:
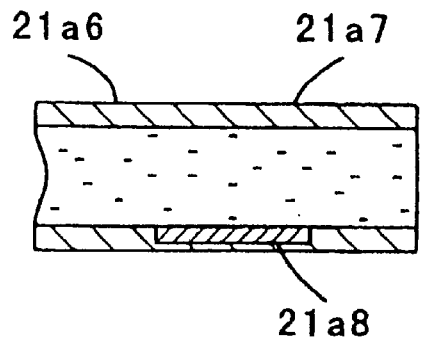
FIGS. 26A to 26E illustrate a case where a color ink is discharged from a bubble-jet type print head.
Figure 26B:
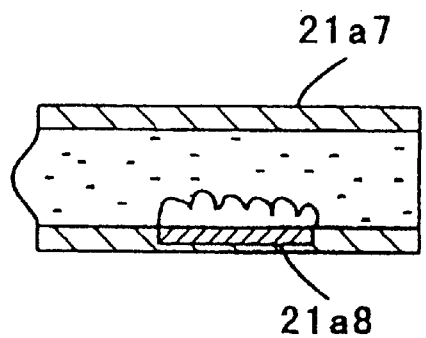
Figure 26C:
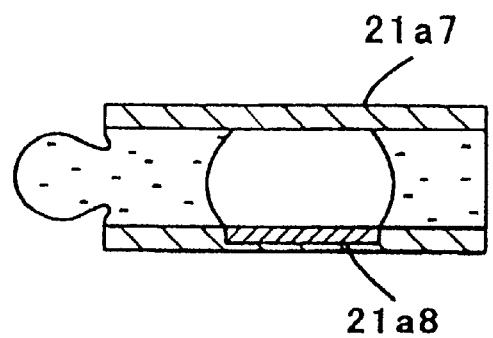
Figure 26D:
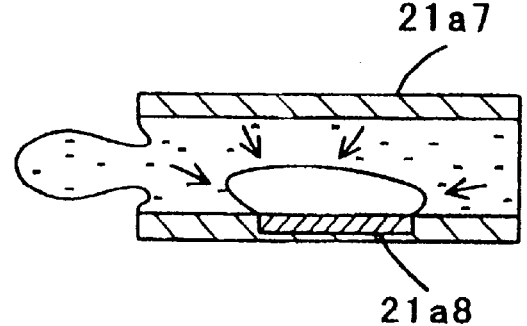
Figure 26E:
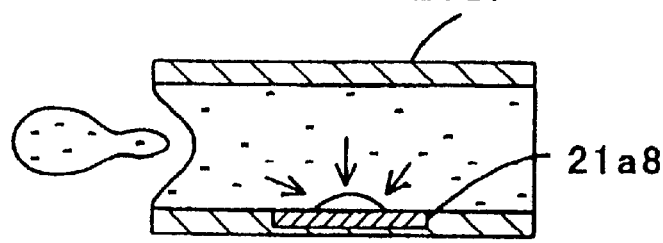

FIGS. 24A and 24B illustrate concrete construction of the print head 21a. FIGS. 25A and 25B show an ink discharging operation of the print head 21a. The print head 21a is provided with an exceedingly narrow pipe 21a3 extending from a color ink tank 21a to a nozzle 21a2. The pipe 21a3 has an ink chamber 21a4 formed at a termination thereof. The ink chamber 21a4 has a wall made of an elastic material and provided with a piezoelectric element 21a5 serving as an electrostrictive element thereon. The piezoelectric element 21a5 distorts its crystal structure when voltage is applied thereto, whereby electric energy is rapidly converted to mechanical energy. Distortion of the crystal structure pushes the wall of the ink chamber 21a4 such that the volume of the ink chamber is reduced. As a result, a predetermined amount of color ink is forcibly discharged from the nozzle 21a2 communicating with the ink chamber 21a4. This pump structure will be referred to as "micro-pump structure."

Each print head unit has two independent nozzles 21a1. Color ink is independently supplied to each nozzle 21a2. Accordingly, six color inks can be used since three print head units are provided. In the example shown in FIG. 23, black ink is supplied to each of the two nozzles 21a2 of the left-hand print head unit. Cyanic ink is supplied to one of the nozzles 21a2 of the central print head unit. Magenta ink and yellow ink are supplied to the nozzles 21a2 of the right-hand print head unit respectively.

This embodiment employs the above-described hardware system, and printing is executed on the basis of the image data obtained by the image input device of the computer system 10. At this time, an interpolating process is performed when there is a difference between the resolution of the original image data and the resolution of the color printer 17b.

Figure 28:
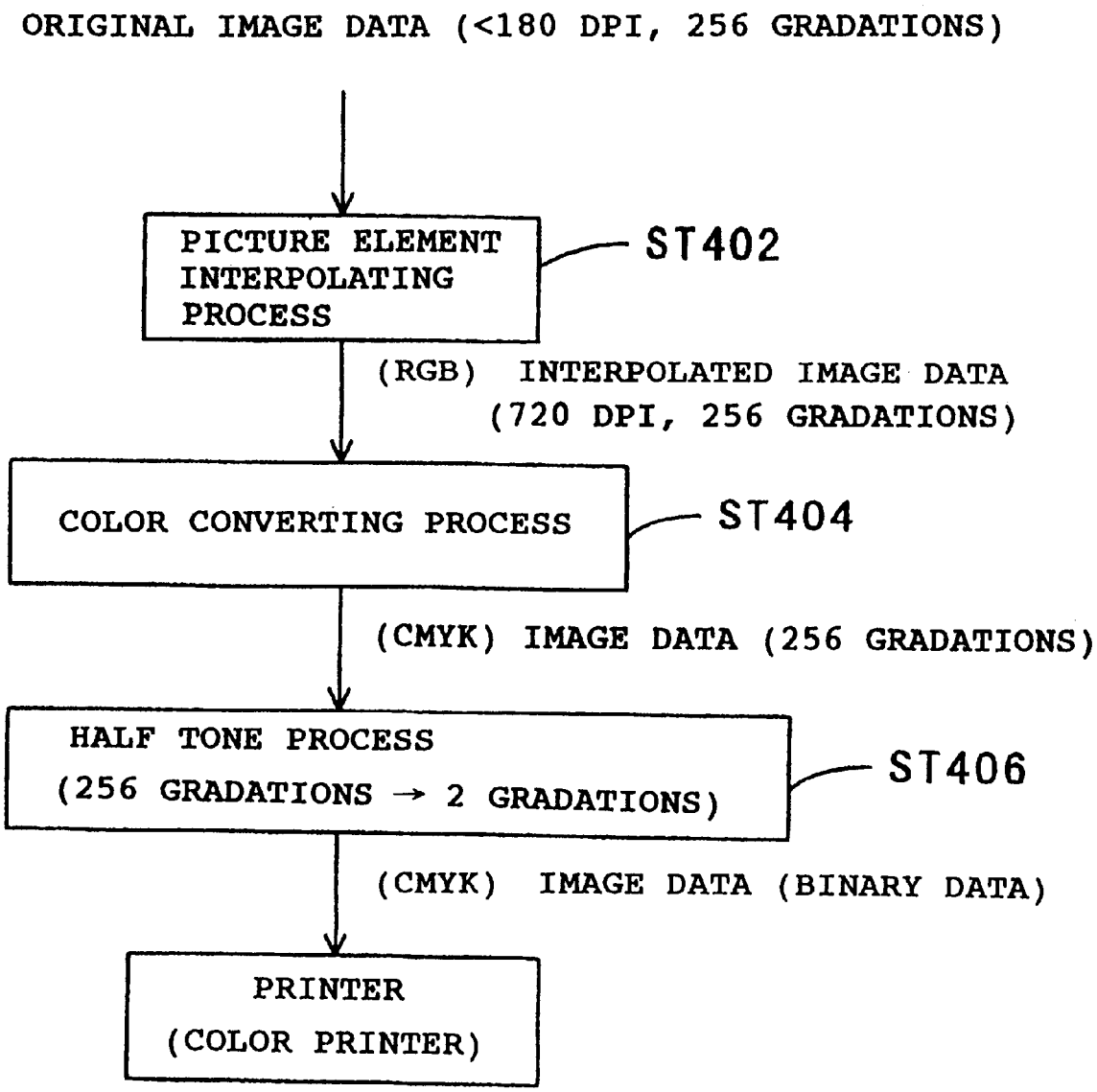
FIG. 28 is a flowchart showing a flow of image data in the image data interpolation apparatus.

The following is a description of variations in the resolution and gradation in a case where the print data is delivered to the color printer 17b when the application 12d has carried out the printing process. FIG. 28 shows processes carried out by the computer system 10 with flow of image data. When the resolution of the original image data represented as dot-matrix picture elements is at or below 180 dpi and at 256 gradation, the picture element interpolating process is carried out at step ST402 so that the resolution of the original image data becomes equal to the resolution of the color printer 17a, that is, 720 dpi. The interpolated image data then has the resolution of 720 dpi and the gradation of 256. Thereafter, when color conversion is executed according to the color inks of the color printer 17b at a step ST404, CMYK image data of 256 gradations is obtained. Finally, a half-tone process is executed at a step ST406 so that binary image data corresponding to representation gradation of the color printer 17b is obtained.

In this example, the picture element interpolating process at the step ST402 constitutes the image data interpolating apparatus of the invention. The printer driver carries out a sequence of image data processing including the step ST402. Accordingly, the printer driver 12c constitutes the image data obtaining unit D1, the interpolating scale factor obtaining unit D2 and the picture element interpolating unit D3.

The printer driver 12c is stored on the hard disk 13b and read into the computer upon start of the computer system 10 to run. When put to work, these drivers recorded on a medium such as a CD-ROM or a floppy disk are installed on the hard disk. Accordingly, such a CD-ROM or floppy disk constitutes a medium on which an image data interpolating program is recorded. In the embodiment, the image data interpolating apparatus is realized as the computer system 10 and more specifically, realized in process of delivering print data to the color printer 17b. However, the printer should not be limited to the ink-jet color printer 21.

The color printer 21 is of the ink-jet type employing the micro-pump mechanism. Color printers employing other mechanisms than the micro-pump mechanism may be used. For example, a bubble-jet color printer as shown in FIGS. 26A to 26E has recently been put to practical use. In a pump mechanism of this color printer, a heater 21a8 is provided on a wall of a pipe 21a7 in the vicinity of a nozzle 21a6. The heater 21a8 is energized to heat up so that bubbles are produced. Resultant pressure discharges color ink.

Figure 27:
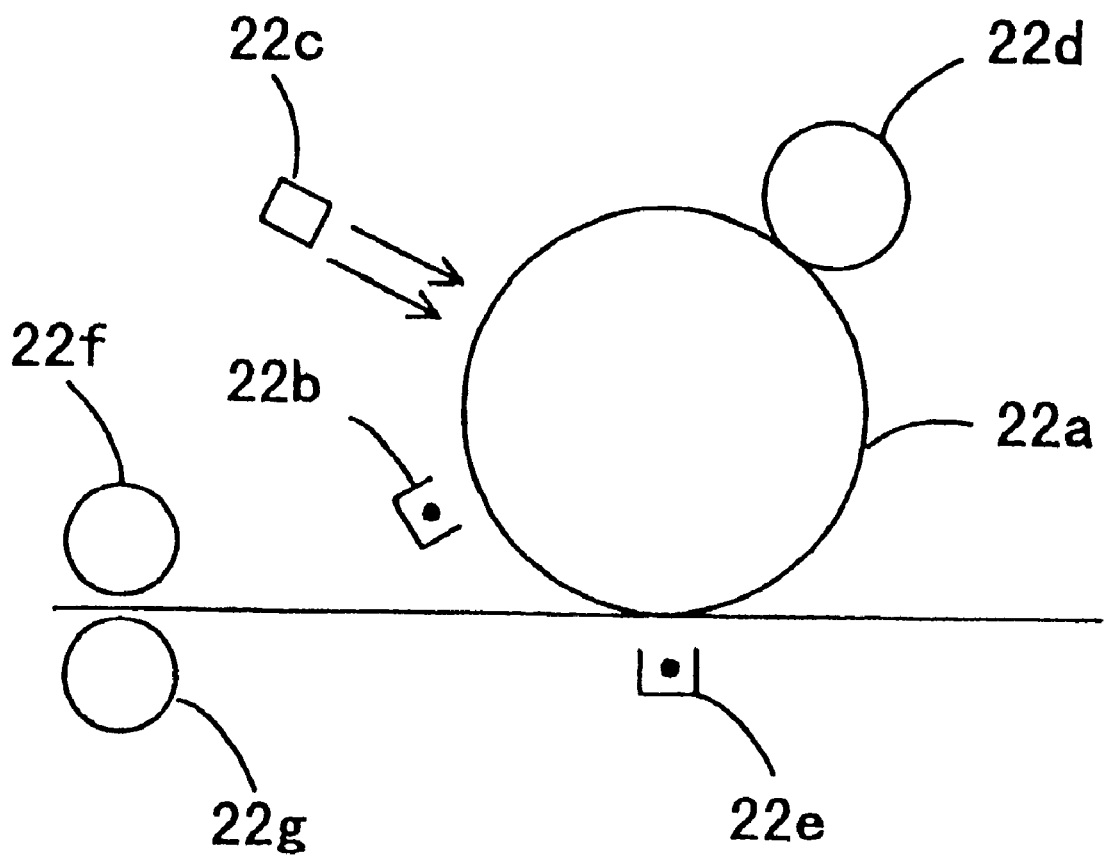
FIG. 27 schematically illustrates a concept of an electrophotographic printer.

As further another mechanism, FIG. 27 shows an electrophotographic color printer 22. Around a rotating drum 22a serving as a photo-sensitive member are provided a charging device 22b, an exposure device 22c, a developing device 22d and a transfer device 22e. After a circumferential face of the rotating drum 22a is uniformly charged with electricity by the charging device 22b, electric charge is removed from a part of the image by the exposure device 22c. Toner is deposited onto the non-charged part by the developing device 22d and then transferred onto the printing paper as the recording medium by the transfer device 22e. Thereafter, the paper is caused to pass between a heater 22f and a roller 22g so that the toner is melted to be fixed on the paper. Since a set of the above-described devices is provided for one color of toner, four sets are individually provided for four colors respectively. Thus, the printing technique should not be limited to a specific construction. Further, various modifications are possible in each printing technique regarding both a range of application and a manner of application.

Figure 29:
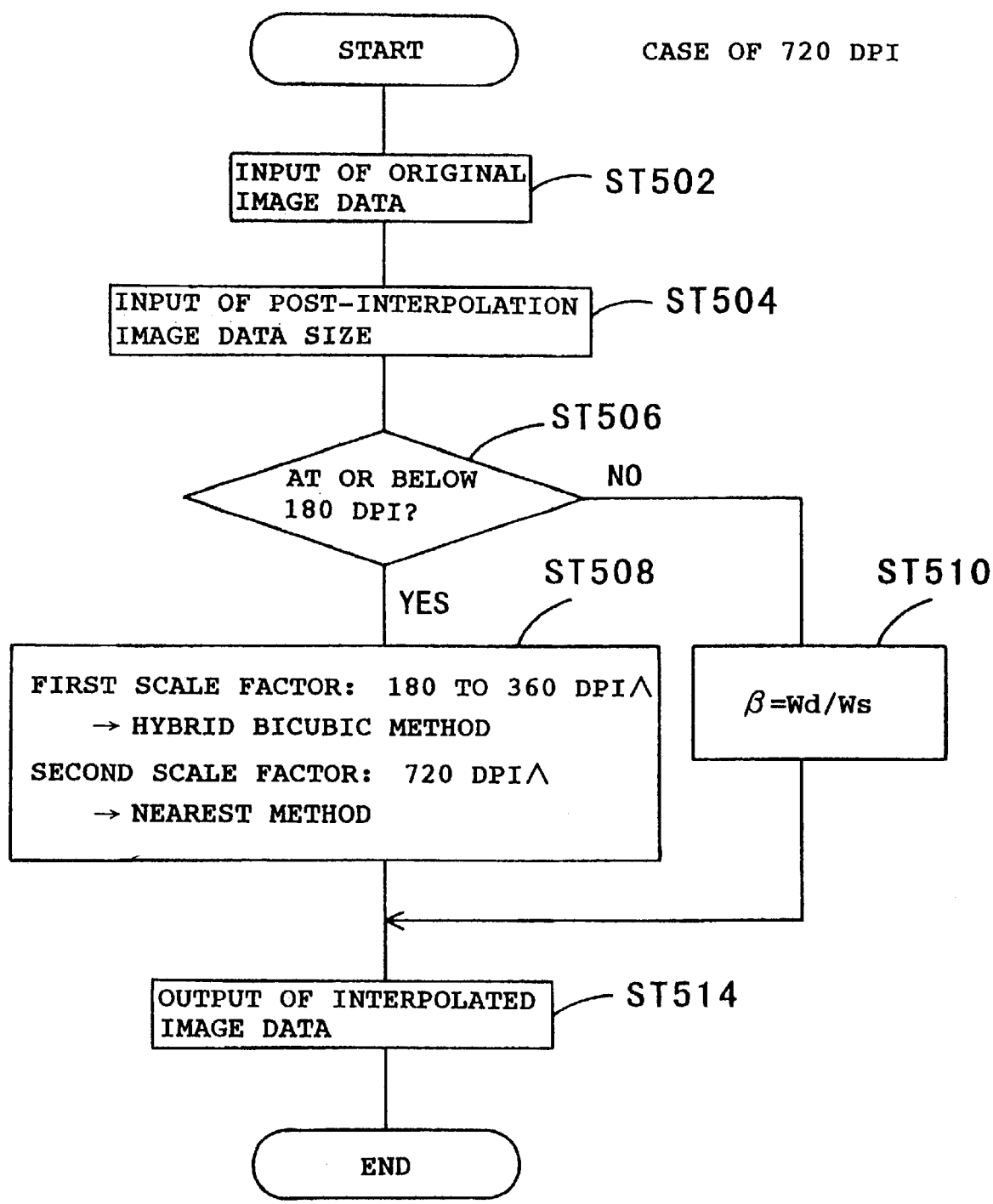
FIG. 29 is a flowchart showing the interpolating process by the image data interpolation apparatus.

A concrete processing realizing the image data interpolating apparatus will now be described. FIG. 29 shows the contents of the aforesaid picture element interpolating process in detail. The original image data is input at a step ST502. For example, the image is read via the scanner 11a on the application 12d. When a printing process is performed after a predetermined image processing, print data with a predetermined resolution is delivered via the operating system 12a to the printer driver 12c. The image may be read by the scanner 11a. The above-described process corresponds to an image data obtaining step from a viewpoint of software. When considered to be combined with hardware such as CPU, the process corresponds to the image data obtaining unit D1.

An interpolating scale factor is obtained for the read image data at a step ST504. For the purpose of obtaining the interpolating scale factor, a post-interpolation image data size is input in this example. There are various manners of obtaining the interpolating scale factor as described above. Here, the interpolating scale factor is obtained by the second example shown in FIG. 9. The post-interpolation image data size is input at the step ST504. The step ST504 thus corresponds to an interpolating scale factor obtaining step. When considered to be integrally combined with hardware such as CPU, the step constitutes the interpolating scale factor obtaining unit D2.

After the post-interpolation image data size has been input at the step ST504, it is determined whether the resolution of the original image data is below 180 dpi, at a step ST506. A suitable interpolating process is carried out at either step ST508 or ST510. The threshold value of 180 dpi results from a printing characteristic of the color printer 17b. More specifically, the color printer 17b has a resolution of 720 dpi as described above and accordingly, has an exceedingly high resolution. Further, a color printer with a resolution of 1440 dpi has recently been developed. However, when an interpolated image is output by a printer with such a high resolution, the image quality may not necessarily be improved as the resolution of the printer is rendered higher.

In a case where the resolution of the original image data is not so high, the printed image becomes smaller when the image is printed with correspondence in the dots without agreement between the resolutions of the original image data and the printed image. Accordingly, the image is usually printed with the agreement of resolutions. When the resolution of the original image data is low, picture elements included in the original image data are interpolated so that the number of constituent picture elements of the image data is increased. In this case, an interpolating process is required. The aforesaid various interpolating processes can be employed and have respective characteristics. The interpolating processes can be classified into a first type in which image data of the nearest picture element is reproduced and a second type in which some computation is performed to generate interpolating picture elements. In the second type, an amount of computation is increased such that the image quality can be improved. However, there is a definite limit. From the inventors' experience, when image data with a resolution lower than 360 dpi is accorded with a resolution of 720 dpi of the color printer 17b, any manner of interpolating process has less influence on the image quality. This is a limitation drawn from the relation between human sight and the printing manner of the color printer 17b.

However, variations in the image quality is visible when the resolution of the image data is at or below 360 dpi. For example, a higher image quality can be achieved when the interpolating process is carried out in the second manner than when the interpolating process is carried out in the first manner. Accordingly, selecting different interpolating processes for the resolution at or below 360 dpi and the resolution exceeding 360 dpi has significance. However, it is not a best way to carry out the interpolating process until 360 dpi when an interpolating process requiring computation is selected as that for the resolution at or below 360 dpi. Since this interpolating process requires a large amount of computation for each of increasing picture elements, all the picture elements of post-interpolation image data need to be obtained by computation in the worst case when the interpolating process is carried out with any scale factor. This results in an enormous amount of computation.

As shown in FIG. 20, the interpolating process is executable with any scale factor. However, when only the interpolating process with an integer scale factor is accepted, the number of picture elements to be computed is decreased such that a high-speed processing can be accomplished. Of course, the direction of width of the image data may be a primary scanning direction and the direction of length of the image data may be a second scanning direction, so that the image data is scanned in this order. Further, the interpolating process may be executed for coordinate values in each block defined by four lattice points. Accordingly, when the resolution is at or below 360 dpi, it is the best way to carry out the interpolation with the integer scale factor in the interpolating process requiring computation and to carry out, for a remaining scale factor, interpolation by an interpolating process requiring a possibly smallest amount of computation. The threshold value is affected by a final printing resolution and an expressible gradation and cannot be fixed unconditionally.

In this embodiment, when the resolution of the original image data is determined to be below 180 dpi at s step ST506, the interpolating process is carried out at a step ST508. In this interpolating process, a first scale factor is introduced as an integer scale factor to increase the resolution to a value ranging between 180 and 360 dpi. The first scale factor is interpolated by the hybrid bicubic method. A remaining scale factor after the multiplication is interpolated by the nearest method. When these two interpolating processes are applied to the flowchart of the embodiment shown in FIG. 29 in due consideration of the characteristics thereof, the interpolating process of the integer scale factor is first carried out. This process requires a large amount of computation but the relatively small number of picture elements. An interpolating process requiring a larger number of picture elements to be interpolated but less computation.

When the original image data has the resolution of 150 dpi, the integer interpolating scale factor in a case where the resolution is at or below 360 dpi is "2" and the resolution becomes 300 dpi as the result of execution of the hybrid bicubic method. Accordingly, the remaining scale factor becomes "2.4" (720/300) and the interpolating process by the nearest method is carried out with the second scale factor set to "2.4." Thus, at the step ST508, with determination of the first scale factor, the interpolating process suitable for the first scale factor is carried out and with determination of the remaining or second scale factor, the interpolating process suitable for the second scale factor is carried out. Accordingly, the step ST508 constitutes an image interpolating step. When considered to be integrally combined with hardware such as CPU, the step constitutes the picture element interpolating unit D3.

In the example shown in FIG. 29, the color printer 17b serving as the printer has the resolution of 720 dpi, and the first scale factor is determined on the assumption of this resolution. The interpolating process with the integer scale factor is first carried out so that the resolution is increased to fall within the range between 180 and 360 dpi. However, when the resolution of the printer is reduced to, for example, 600 dpi, an upper limit of the range is rendered a value at or below a part of the resolution divided by any integer. For example, the upper limit is 300 dpi in this example.

Figure 30:
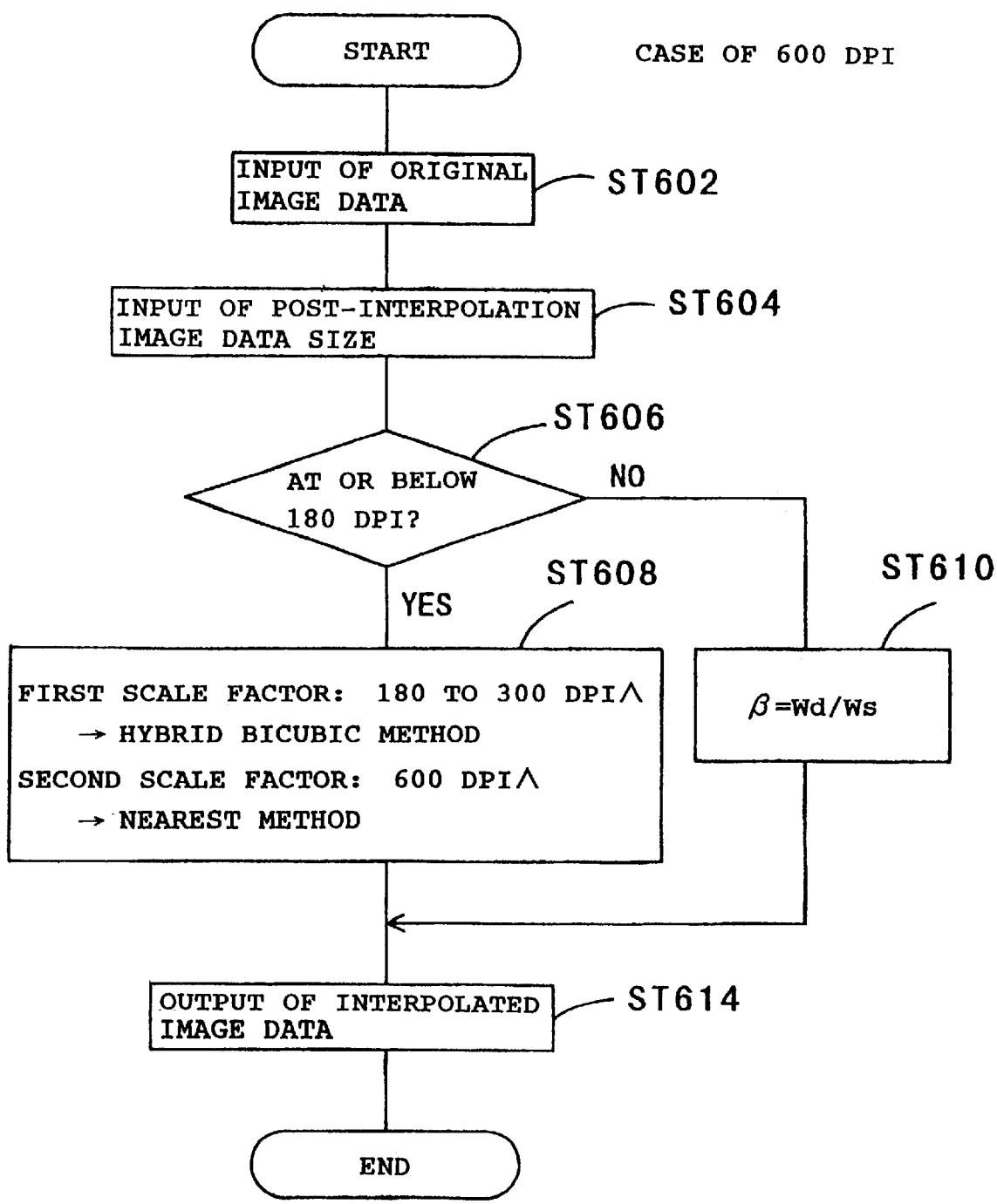
FIG. 30 is a flowchart showing the interpolating process by the image data interpolation apparatus in a case where a resolution of the printer has been switched.

In an example shown in FIG. 30, the aforesaid range is between 180 and 300 dpi when the first scale factor is determined at a step ST608. When the input original image data has a resolution of 72 dpi, for example, the integer interpolating scale factor in a case where the resolution is at or below 300 dpi is "4" and the resolution is interpolated up to 288 dpi as the result of execution of the interpolating process by the hybrid bicubic method. Accordingly, the remaining scale factor, about "2.1" (600/288) is used as the second scale factor and the interpolating process by the nearest method is carried out.

When it is determined at the step ST506 or ST606 that the resolution of the original image data is above 180 dpi, the manner of the interpolating process to equalize the resolution of the original image data to that of the printer does not necessarily improve the image quality. Accordingly, the interpolating process is carried out by the nearest method at the step ST510 or ST610.

Upon completion of the interpolating process, the interpolated image data is output at a step ST514 or ST614. Thereafter, however, the color conversion process and the half tone process are carried at steps ST404 and ST406 respectively. Thus, the output of the image data means delivery of the image data to a next stage.

In the computer system 10 including the ink-jet color printer 17b, the interpolating process is carried out when the resolution of the color printer 17b does not agree with that of the original image data. In the interpolating process, the interpolating scale factor is divided into the first scale factor which is an integer scale factor and the second scale factor which is the remaining scale factor. Different interpolating processes are carried out for the respective scale factors. Accordingly, the interpolating process of the integer scale factor is carried out by the hybrid bicubic method, and the interpolating process of the remaining scale factor is successively carried out by the nearest method. Consequently, an optimum balance can be achieved between the amount of computation in the interpolating process and the improvement of the image quality.

The picture elements need to be interpolated at any scale factor in the interpolating process. However, the existing picture elements are interpolated between the picture elements in the interpolating process of the integer scale factor. This reduces an amount of computation in the interpolating process. Accordingly, when a plurality of interpolating processes are carried out, dividing the interpolating process into that of the integer scale factor and that for the remaining scale factor has significance. However, merely dividing the interpolating process into the two processes as described above does not necessarily accompany an improvement in the image quality. This is due to the characteristic of the printer which performs the printing in a low gradation representation based on whether dot of a recording agent such as recording ink is deposited. Accordingly, successively executing the interpolating process resulting in improvement of the characteristic and another interpolating process from another point of view has significance. Consequently, an image data interpolating apparatus can be provided which can cause the printer to print the image on the basis of an optimum result of interpolation by carrying out an interpolating process achieving a result of interpolation corresponding to the characteristic of the printer and another interpolating process not achieving such a result.

In the picture element interpolating unit, various modifications are possible in the manner of dividing the interpolating scale factor in the relation to a sequence of the interpolating process. As one example, the interpolating process is carried out with the first scale factor so that the resolution of the image data is rendered lower than a resolution of a first threshold value which is a part of the recording resolution of the printer divided by a predetermined integer, and the interpolating process is successively carried out with the second scale factor, so that the resolution of the image data is equalized to the recording resolution of the printer.

In this case, too, the interpolating process is first carried out with the first scale factor equal to the integer interpolating scale factor and then, the interpolating process is successively carried out with the second scale factor. In this case, the resolution obtained by the interpolation with the first scale factor is lower than the resolution which is a part of the recording resolution of the printer divided by the predetermined integer. The second scale factor is a remaining scale factor and at or above an inverse number of the part of the recording resolution of the printer. Then, the picture elements are interpolated between existing picture elements in the first interpolation, and one or more picture elements are further interpolated between the picture elements. Consequently, the image data is scaled up four times or more. With this scale factor, the improvement in the image quality by the interpolating process is nearly the limit in view of the characteristic of the printer, so that balance of throughput can be achieved by execution of a plurality of interpolating processes.

In achieving the balance of throughput, the interpolating process is carried out with the first scale factor so that the resolution can be ranged between 180 and 480 dpi, and the resolution can be equalized to the recording resolution of the printer by the interpolating process with the second scale factor. From the inventors' experience, in a case where the printer has the resolution of 720 dpi, the resolution of the image data is increased to 480 dpi as the result of the interpolating process with the scale factor of "2" which is the minimum multiple when the resolution of the original image data is 240 dpi. Further improvement in the image quality cannot be achieved even when a high-precision interpolating process is carried out so that a higher resolution is obtained. On the other hand, since reproduction requiring no computation is later carried out, a certain level of resolution needs to be obtained by the first high-precision interpolating process. In this case, an allowable range of about 180 dpi is required. Then, in order that the interpolating process with the integer scale factor may be executable up to 240 dpi and the lowest resolution of about 180 dpi may be obtained, the first interpolating process needs to be carried out so that the resolution is ranged between 180 and 480 dpi.

Figure 31:
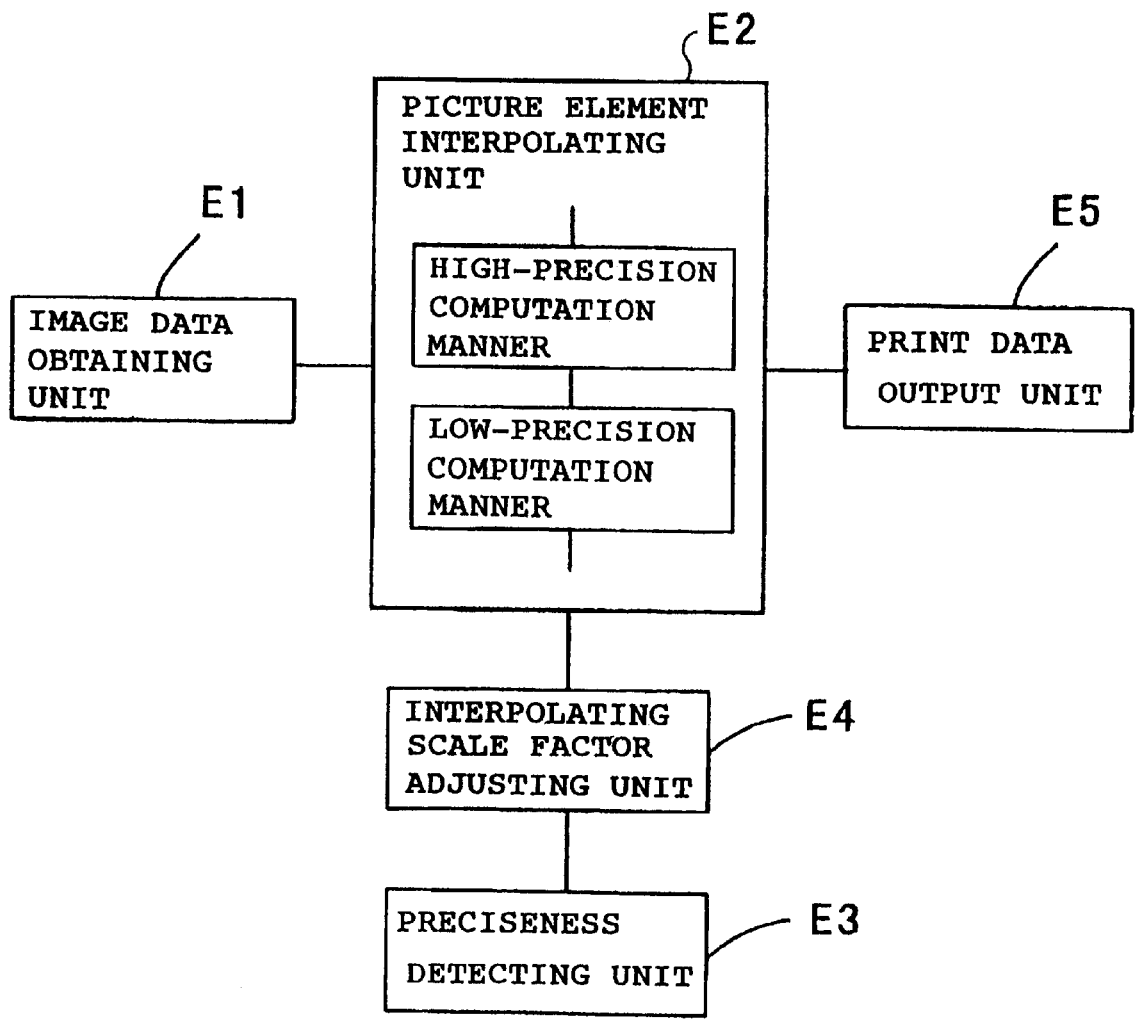
FIG. 31 is a schematic block diagram showing another application example of the image data interpolation apparatus.

Further another embodiment will be described in which the scale factor at which one interpolating process is switched to another. interpolating process when a plurality of interpolating processes are carried out. This results from human sight and a computing efficiency can be improved by changing the switching scale factor. FIG. 31 shows the image data interpolating apparatus of this embodiment. The image data interpolating apparatus carries out the interpolating process for the constituent picture elements of the image data with the human sight with a delicate interrelation being taken into account. An image data obtaining unit E1 obtains image data comprising dot-matrix picture elements in multiple gradation representation. A picture element interpolating unit E2 performs an interpolation with a high-precision computation and thereafter another interpolation with a low-precision computation. When the interpolating process is carried out for the image data by the picture element interpolating unit E2, a preciseness detecting unit E3 detects preciseness in the printing. Based on the preciseness detected by the preciseness detecting unit E3, an interpolating scale factor adjusting unit E4 computes a load ratio in the picture element interpolating unit E2. At this time, the interpolating scale factor is adjusted so that a load scale factor assigned to the high-precision computation is increased as the detected precision becomes higher. The picture element interpolating unit E2 interpolates in the high-precision computation manner and then in the low-precision computation manner according to the adjusted interpolating scale factor. A print data output unit E5 converts the interpolated image data to predetermined print data, outputting the print data.

Figure 32:
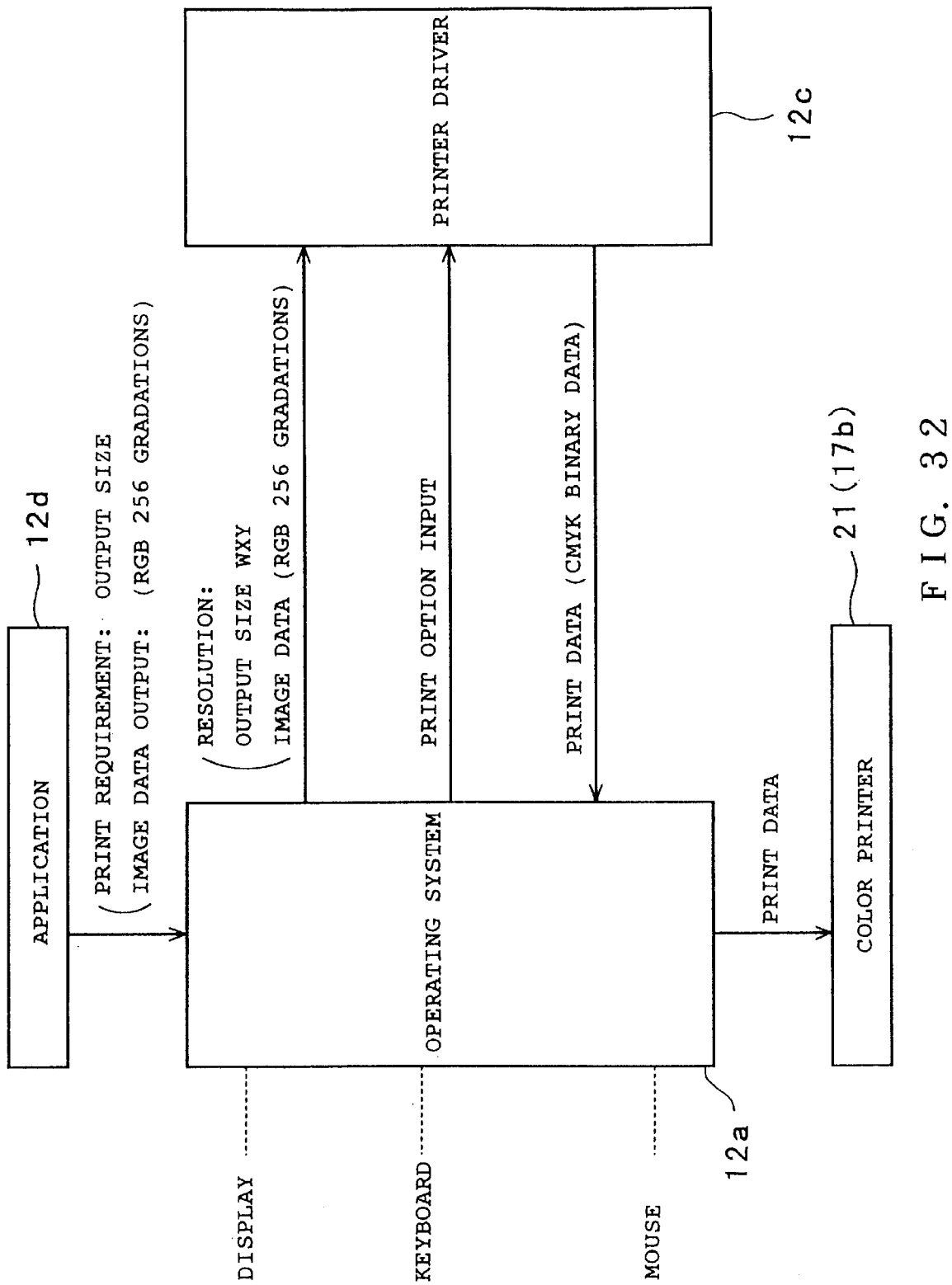
FIG. 32 is a schematic block diagram showing a flow of image data in the image data interpolation apparatus.

The following is a description of variations in the resolution and gradation in a case where the print data is delivered to the color printer 17b when the application 12d has carried out the printing process. FIG. 32 shows processes carried out by the computer system 10 with flow of image data.

The application 12b generates printing requirement which is supplied to the operating system 12a. At that time, the application 12b delivers an output size and image data of 256 gradations. The operating system 12a then delivers the output size and the image data to the printer driver 12c. The printer driver 12c inputs from and outputs to the operating system data so that print option is input. Controlling the display 17a via the display driver 12b so that the displaying operation is performed, the operating system 12a delivers the results of operation of the keyboard 15a and/or mouse 15b to the printer driver 12c. The printer driver 12c generates print data based on the delivered operation results or print option. The generated print data is normally binary data of CMYK and is delivered via the operating system 12a and hardware port to the color printer 17b. In this example, the printer driver 12c constitutes the aforesaid image data obtaining unit E1, the picture element interpolating unit E2 and the print data output unit E5. The printer driver 12c further constitutes the preciseness detecting unit E3 and the interpolating scale factor adjusting unit E4 both performing processing contents which will be described later.

Figure 33:
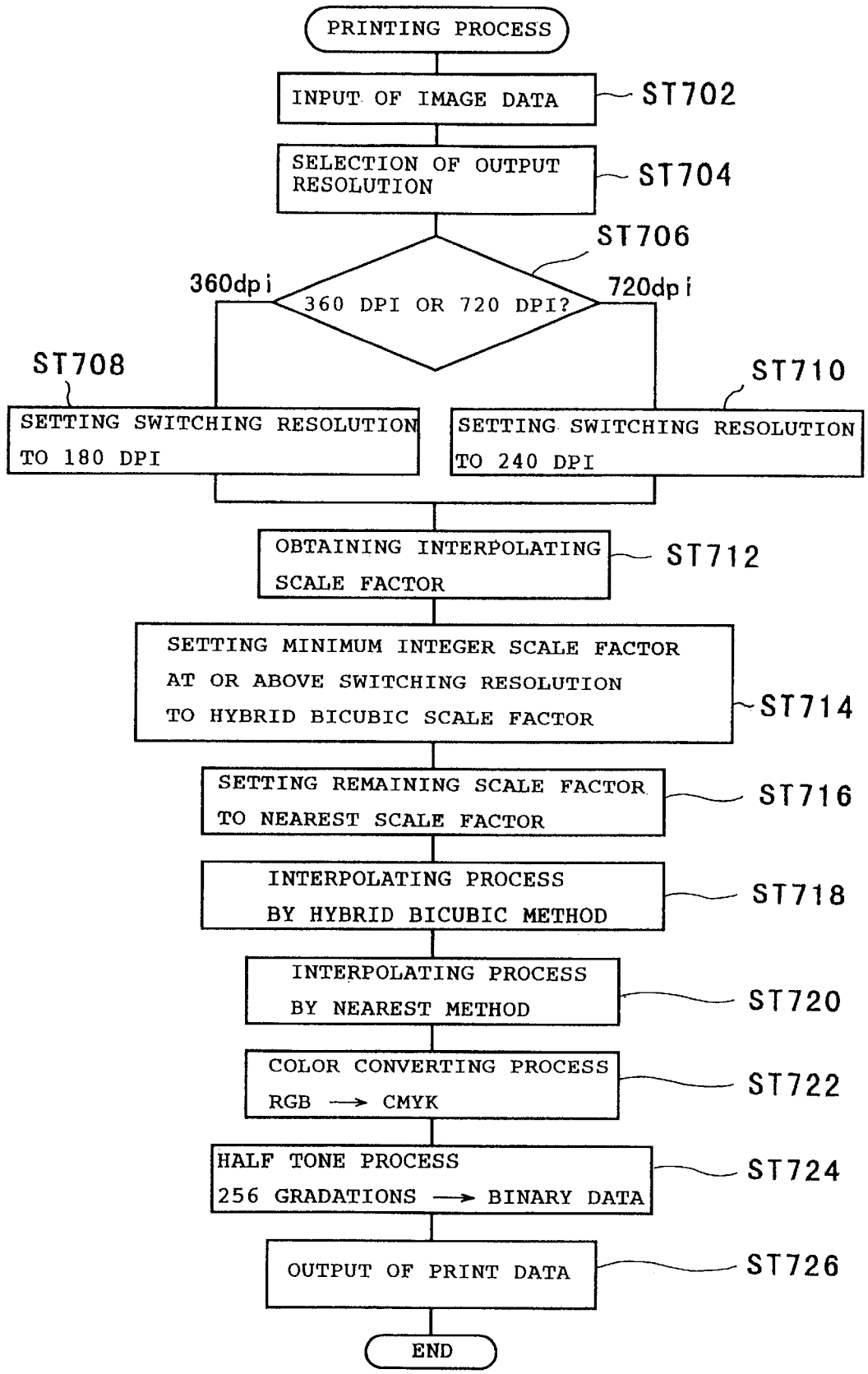
FIG. 33 is a flowchart showing a printing process in the image data interpolation apparatus.

The contents of the printing process will be described with reference to FIG. 33. The image data is input at a step ST702. For example, the image is read via the scanner 11a on the application 12d. When a printing process is performed after a predetermined image processing, print data with a predetermined resolution is delivered via the operating system 12a to the printer driver 12c. The image may be read by the scanner 11a. The above-described process corresponds to an image data obtaining step. When considered to be integrally combined with hardware such as CPU, the process corresponds to the image data obtaining unit E1.

Figure 34:
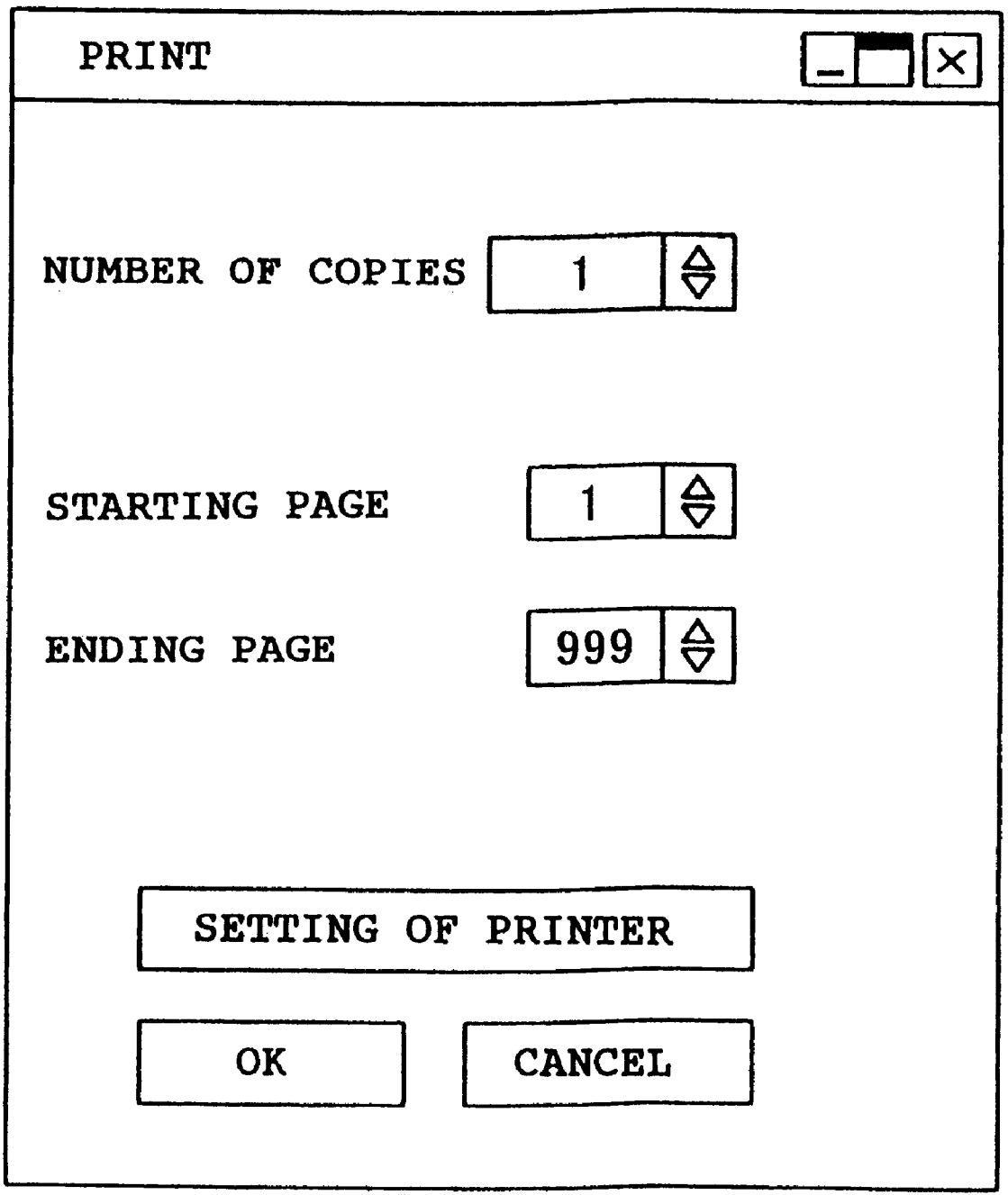
FIG. 34 illustrates an operation window for the printing process on a screen of a display.

At a step ST702, an output resolution is selected in order that the preciseness in the printing may be obtained. When the printing is carried out on the application 12d, a window screen for the printing operation is displayed as shown in FIG. 34 in a case where the operating system 12a provides GUI environment. Various parameters may be used in this case. For example, the parameters include "NUMBER OF COPIES (to be printed)," "STARTING PAGE," "ENDING PAGE," etc. Further, an "OK" button and a "CANCEL" button and a "PRINTER SETTING" button are provided as operation designating buttons.

Figure 35:
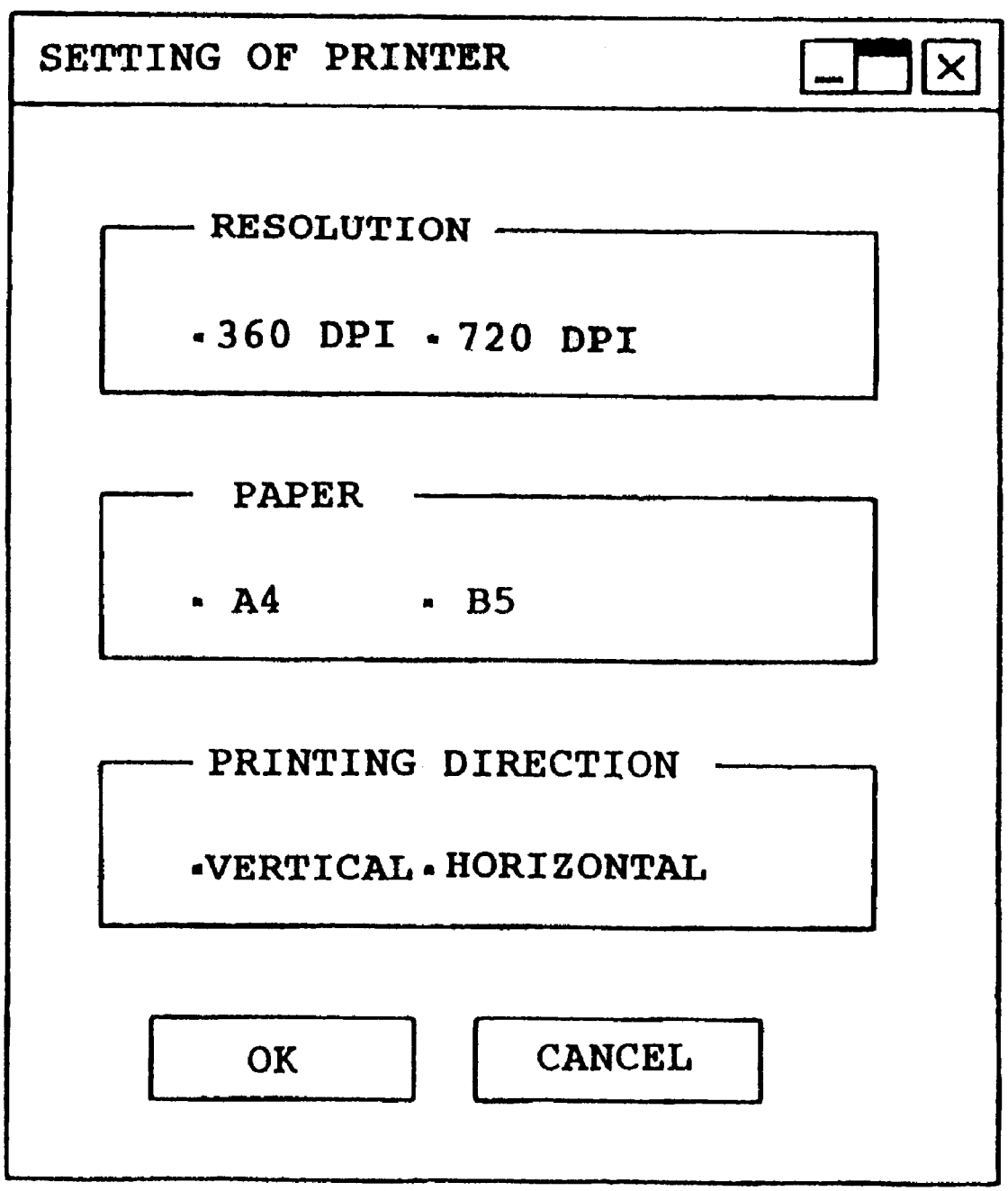
FIG. 35 illustrates an operation window for setting of a printer on the screen.

When "PRINTER SETTING" is designated, a window screen as shown in FIG. 35 is displayed. This window screen is provided so that various settings are performed according to the functions of each printer. In this example, a printing resolution is selected between 360 dpi and 720 dpi. Further, paper is selected between "A4" and "B5." A printing direction is selected between "VERTICAL" and "HORIZONTAL." Selection of resolution has an important meaning in the embodiment. When a resolution has been selected at a step ST704, a setting file is referred to and read out. When an operator changes the resolution upon the printing operation, the changed resolution is read out as an output resolution. In any case, this selecting process is a preciseness detecting step. When considered to be integrally combined with hardware such as CPU, the process corresponds to the preciseness detecting unit E3. Although the resolution selected in a software manner on the basis of the window screen is detected as the preciseness in the embodiment, the preciseness selecting manner should not be limited to this. It may be modified both in the software manner and in a hardware manner. In the software manner, displaying other the window screen may be performed. The resolution need not be directly selected, and an indirect parameter such as a printing speed may be selected since the printing speed is low when the resolution is high and is high when the resolution is low.

At a step ST706, the processing is diverted on the basis of the selected resolution. Switching resolutions are set at steps ST708 and ST710 respectively. The flow of the picture element interpolating process will be described before description of the switching resolutions. The switching resolution is set to 180 dpi at the step ST708, whereas the switching resolution is set to 240 dpi at the step ST710. An interpolating scale factor is obtained at a step ST712, and an interpolating scale factor for the first stage of the interpolation is obtained from the relation between the interpolating scale factor and each switching resolution. The obtained interpolating scale factor is set as a hybrid bicubic scale factor at a step ST714. Successively, a remaining interpolating scale factor is obtained and is set as a nearest scale factor at a step ST716. Thereafter, the interpolating processes are carried out with both interpolating scale factors at steps ST718 and ST720 respectively. These interpolating processes are carried out by different manners respectively. The former is the interpolating process by the high-precision computation, whereas the latter is the interpolating process by the low-precision computation.

The following advantage is obtained from successive execution of these two different computation manners. Since the hybrid bicubic method requires a large amount of computation for every interpolated picture element, it cannot substantially be employed when the interpolating scale factor is large. On the other hand, the interpolating process is often carried out for the printing purpose to resolve difference of the resolutions. Further, the resolution of the printer is increased for improvement in the image quality even though the printing is performed at a low gradation. Accordingly, when the dot diameter is reduced to a certain value, the high-precision computation result cannot necessarily achieve a fine image quality actually. In other words, improvement in the image quality corresponding to an increase in the amount of computation cannot be achieved when the dot diameter exceeds a certain level. Accordingly, the image quality does not vary to a large extent even when the interpolating process is carried out in the hybrid bicubic method to a certain degree and thereafter, the interpolating process is carried out in the nearest method. Further, an amount of computation is reduced to a large extent in this case.

Then, when the interpolating scale factor is obtained at the step ST712, the hybrid bicubic and nearest scale factors are set to the respective steps ST714 and ST716 so that the obtained interpolating scale factor is achieved by two stages. The switching resolutions are required for assignment of the interpolating scale factor to the two interpolating processes. More specifically, in order that the above-described balance between the amount of computation and the scale factor may be retained, a ratio of the hybrid bicubic scale factor to the nearest scale factor is not determined to be constant, but the interpolating process is carried out by the hybrid bicubic method so that the resolution of the image data is increased to or above the switching resolution and the interpolating process is carried out by the nearest method concerning the remaining scale factor.

Further, the insufficient scale factor is not determined to be the nearest scale factor after the resolution has been converted to equalize the switching resolution in the interpolating process by the hybrid cubic method. The hybrid bicubic scale factor is determined to be a scale factor of minimum integer to exceed the switching resolution. All picture elements of post-interpolation image data need to be obtained by computation when the interpolating process is carried out with any scale factor. This results in an increase in the amount of computation. On the other hand, a part of the picture elements agree with the lattice points of existing picture elements in the case of an integral scale factor such that a substantial amount of computation can be decreased.

The interpolating scale factors of the hybrid bicubic and nearest methods are adjusted by using the switching resolutions. However, the switching resolutions themselves are varied according to the output resolution at the steps ST708 and ST710. The following is the reason for this. As an example, input image data have resolutions of 170 dpi and 185 dpi respectively. In a case where the switching resolution is fixed at 180 dpi, a case where the output resolution is set to 360 dpi is compared with another case where the output resolution is set to 720 dpi. In this example, the former image data is interpolated by the hybrid bicubic method to be doubled so as to have a resolution of 340 dpi, whereas the latter image data is not interpolated by the hybrid bicubic method. However, the printing preciseness is not high when the output resolution is at 360 dpi. Accordingly, inversion of the image quality cannot be found even when the resolutions of the former image data interpolated by the hybrid bicubic method and the latter image data not interpolated by the hybrid bicubic method finally become 360 dpi. However, when the output resolution is 720 dpi, the former image data is rendered precise and improvement in the image quality can be visually recognized, so that inversion occurs.

Thus, since the difference is based on human delicate feeling, to increase the switching resolution in proportion to the output resolution is not proper. Further, since the difference further results from tolerance of the computing time, there is no way but to determine on the basis of experiments. In the embodiment, in view of such balance, the switching resolution is set to 180dpi when the output resolution is 360 dpi and to 240 dpi when the output resolution is 720 dpi. That is, the output resolution is doubled, whereas the latter switching resolution is 1.33 times as large as the former one.

In a case where the aforesaid example is applied to this case, both resolutions of 170 dpi and 185 dpi are smaller than the switching resolution, 240 dpi, when the output resolution is set to 720 dpi. As a result, each hybrid bicubic scale factor is set to "2" so that each resolution is multiplied by any integer so as to exceed 240 dpi. Then, the interpolating process is carried out by the hybrid bicubic method until 340 dpi and 370 dpi are reached, and the interpolating process is carried out by the nearest method for the remaining scale factors of 720/340 times and 720/370 times. The image quality is not inverted since the interpolating process is carried out by the hybrid bicubic method until 340 dpi and 370 dpi are reached. The nearest scale factor does not take any integral multiple. However, this does not result in a serious problem since an amount of computation is originally small.

Upon completion of the interpolating process at a step ST718 or ST720, the color converting process is carried out at a successive step ST722, and a half tone process is carried out so that the image data is converted to binary data according to the performance of the printer 17b. By the half tone process, color distortion can be minimized by using a large number of dots.

Finally obtained CMYK binary print data is output to the color printer 17b at a step ST726. Accordingly, the steps ST722 to ST726 constitutes a print data output step. When considered to be combined with hardware such as CPU, the processes correspond to the print data output unit E5. Of course, the forms of print data vary depending on the printers, and the print data need not be output directly to the printer but may be stored in a file format. Accordingly, output of the print data means delivery of the data to a next stage.

In the computer system 10 including the ink-jet color printer 17b, the interpolating process is carried out when the resolution of the color printer 17b does not agree with that of the original image data. In the interpolating process, the high-precision computation is first performed so that the resolution of the image data is increased to or above the switching resolution, and the low-precision computation is then performed so that the resolution of the image data equalizes the final resolution. Further, the switching resolution is changed according to the preciseness in the printing by the color printer 17b. Accordingly, the load scale factor of the high-precision computation is increased as the final preciseness becomes higher. This prevents or restrains an inversion phenomenon that the image quality is deteriorated although the final preciseness is high.

As obvious from the foregoing, the load scale factor of the interpolating scale factor used in the high-precision computation is increased as the preciseness in the printing becomes higher, and accordingly, the load scale factor interpolated by the high-precision computation is increased such that the image quality is improved. Consequently, even when the remaining load scale factor is interpolated by the low-precision computation, the inversion of image quality can be prevented. More specifically, as the preciseness in the printing becomes higher, the preciseness at the time the image data is delivered from the high-precision computation to the low-precision computation affects the image quality. Accordingly, the load rate of the high-precision computation is increased as the preciseness in the printing becomes higher. Thus, the load scale factor of the interpolating scale factor used in the high-precision computation is increased as the preciseness in the printing becomes higher. Consequently, since the load scale factor interpolated by the high-precision computation is increased such that the image quality is improved, the image quality inversion can be prevented even when the remaining load scale factor is interpolated by the low-precision computation.

The picture element interpolating unit may only carry out the interpolating process by the high-precision and low-precision computation manners. However, the computation manners should not be limited two computation manners. Further, the high-precision computation is high relative to the low-precision computation and the low-precision computation is low relative to the high-precision computation. No reference value is required.

The load scale factor is not necessarily the ratio of the interpolating scale factor performed by the high-precision computation to that performed by the low-precision computation. Accordingly, the interpolating scale factor performed by the high-precision computation may gradually be decreased. The load scale factor is increased while the interpolating scale factor is gradually decreased. This means that a ratio of the interpolating scale factor in a case where the load scale factor is not varied to that in a case where the load scale factor is varied may be increased. As one example, the interpolation is carried out by the high-precision computation until the resolution of the image data exceeds the switching resolution which is a predetermined resolution. The interpolation is further carried out by the low-precision computation until the remaining resolution is reached. However, the switching resolution is increased when the preciseness in the printing is high. Assume now a case where the preciseness in the printing is low. The switching resolution set in this case is reduced, and the interpolation of the interpolating scale factor at which the resolution of the image data exceeds the switching resolution is carried out in the high-precision computation manner. However, the switching resolution is increased as the preciseness in the printing becomes higher and in such a case, the interpolation is carried out in the high-precision computation manner until the switching resolution is reached. Accordingly, the interpolating scale factor is increased. In this sense, the load scale factor is increased. Consequently, since the load scale factor is substantially changed only by varying the switching resolution, adjustment can be rendered easier.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. An image data interpolation apparatus comprising:
   an image data obtaining means for obtaining image data representing an image as dot-matrix picture elements;
   an interpolating scale factor obtaining means for obtaining an interpolating scale factor of an interpolating process to be executed for the obtained image data; and
   picture element interpolating means for determining interpolating scale factors of a plurality of interpolating processes which are successively executed so that said obtained interpolating scale factor on the basis of said detected resolution is achieved when said plurality of interpolating processes are successively executed and thereby constituent picture elements of said image data are increased by using a predetermined interpolating process, and for executing said plurality of interpolating processes by using said determined interpolating scale factors;
   wherein said picture element interpolating means divides an interpolating scale factor into a first integer scale factor and a second remaining real number scale factor, executes a relatively high level operating process with said first scale factor in a prior interpolating process to thereby generate image data, and executes a relatively easy operating process with said second scale factor in a subsequent interpolating process to thereby generate image data.

2. An image data interpolation method sequentially executing steps of:
   obtaining image data representing an image as dot-matrix picture elements;
   obtaining an interpolating scale factor of an interpolating process to be executed for the obtained image data; and
   determining an interpolating scale factors of a plurality of interpolating processes which are successively executed so that said obtained interpolating scale factor on the basis of said detected resolution is achieved when said plurality of interpolating processes are successively executed and thereby constituent picture elements of said image data are increased by a predetermined interpolating process, and executing said plurality of interpolating processes by using said determined interpolating scale factors;
   wherein, in the step of executing said plurality of interpolating processes, an interpolating scale factor is divided into a first integer scale factor and a second remaining real scale factor, a relatively high level operating process is executed using said first scale factor in a prior interpolating process to thereby generate image data, and a relatively easy operating process is executed using said second scale factor in a subsequent interpolating process to thereby generate image data.

3. A medium that records an image data interpolating program causing a computer to execute an interpolating process in order to increase constituent picture elements of image data representing an image as dot-matrix picture elements by using a predetermined interpolating scale factor, the image interpolating program comprising:
   a function obtaining image data representing an image as dot-matrix picture elements;
   a function obtaining an interpolating scale factor of an interpolating process to be executed for the obtained image data; and
   a function determining interpolating scale factors of a plurality of interpolating processes which are successively executed so that said obtained interpolating scale factor on the basis of said detected resolution is achieved when said plurality of interpolating processes are successively executed and thereby constituent picture elements of said image data are increased by a predetermined interpolating, and executing said plurality of interpolating processes by using the determined interpolating scale factors;
   wherein, in the function executing said plurality of interpolating processes, an interpolating scale factors is divided into a first integer scale factor and a second real scale factor, a relatively high level operation process is executed using said first scale factor in a prior interpolating process to thereby generate image data, and a relatively easy operation process is executed using said second scale factor in a subsequent interpolating process to thereby generate image data.

4. An image data interpolation apparatus comprising:

image data obtaining means obtaining image data representing an image as dot-matrix picture elements;

interpolating scale factor obtaining means obtaining an interpolating scale factor of an interpolating process to be executed for the obtained image data; and picture element interpolating means for executing an interpolating process by a relatively high level operating process so that said obtained interpolating scale factor is achieved when said obtained interpolating scale factor is under a predetermined scale factor, and for executing first an interpolating process by a relatively high level operating process and then an interpolating process by a relatively easy level operating process when said obtained interpolating scale factor is over the predetermined scale factor, in order to achieve said obtained interpolating scale factor by executing interpolating processes.

5. An image data interpolation method comprising steps of:

obtaining image data representing an image as dot-matrix picture elements;

obtaining an interpolating scale factor of an interpolating process to be executed for the obtained image data; and executing an interpolating process by a relatively high level operating process so that said obtained interpolating scale factor is achieved when the obtained interpolating scale factor is under a predetermined scale factor, and executing first an interpolating process by a relatively high level operating process and then an interpolating process by a relatively easy operating process when the obtained interpolating scale factor is over the predetermined scale factor, in order to achieve the obtained interpolating scale factor by executing interpolating processes.

6. A medium that records an image data interpolating program causing a computer to execute an interpolating process in order to increase constituent picture elements of image data representing an image as dot-matrix picture elements by using a predetermined interpolating scale factor, the image interpolating program comprising:

a function obtaining said image data;

a function obtaining an interpolating scale factor of an interpolating process to be executed for the obtained image data; and a function executing an interpolating process by a relatively high level operating process so that the obtained interpolating scale factor is achieved when the obtained interpolating factor is under a predetermined scale factor, and executing first an interpolating process by a relatively high level operating process and then an interpolating process by a relatively easy operating process when the obtained interpolating scale factor is over the predetermined scale factor, in order to achieve said obtained interpolating scale factor by executing interpolating processes.

7. An image data interpolation apparatus comprising:

image data obtaining means for obtaining image data representing an image as dot-matrix picture elements;

interpolating scale factor obtaining means for obtaining an interpolating scale factor of an interpolating process to be executed for the obtained image data and a resolution for the printout of the obtained image data; and picture element interpolating means for successively executing a plurality of interpolating processes so that picture elements of said obtained image data are increased, in order to achieve said obtained interpolating scale factor;

wherein said picture interpolating means determines a load rate according to said obtained resolution when said interpolating scale factor is divided into a first scale factor and a remaining second scale factor according to said load rate, and executes said plurality of interpolating processes by using the first and second scale factors determined according to the changed switching scale factor.

8. An image data interpolation method sequentially executing steps of:

obtaining image data representing an image as dot-matrix picture elements;

obtaining an interpolating scale factor of an interpolating process to be executed for the obtained image data;

obtaining a resolution for the printout of the obtained image data;

increasing constituent picture elements of said image data by executing successively a plurality of interpolating processes so that said obtained interpolating scale factor is achieved;

wherein, in the step of executing said plurality of interpolating processes, a load rate is determined according to said obtained resolution when said obtained interpolating scale factor is divided into a first scale factor and a second remaining scale factor according to said load rate, and said first and second scale factors determined according to the load rate are used to successively execute said plurality of interpolating processes.

9. A medium that records an image data interpolating program causing a computer to execute an interpolating process in order to increase constituent picture elements of image data representing an image as dot-matrix picture elements by using a predetermined interpolating scale factor, the image interpolating program comprising:

a function obtaining image data representing an image as dot-matrix picture elements;

a function obtaining an interpolating scale factor of an interpolating process to be executed for the obtained image data;

a function obtaining a resolution for the printout of the obtained image data; and a function successively executing a plurality of interpolating processes and thereby increasing constituent picture elements of said image data are increased so that said obtained interpolating scale factor is achieved;

wherein, in the function executing said interpolating processes, when said interpolating scale factor is divided into a first scale factor and a second remaining scale factor according to a load rate, said switching scale factor is changed according to said obtained resolution, and the first and second scale factors determined according to the load rate are used to successively execute said plurality of interpolating processes.

* * * * *